(12) United States Patent
Ibaraki et al.

(10) Patent No.: US 7,475,541 B2
(45) Date of Patent: Jan. 13, 2009

(54) RANKINE CYCLE SYSTEM AND VEHICLE THEREWITH

(75) Inventors: Shigeru Ibaraki, Saitama (JP); Takeo Kiuchi, Saitama (JP); Tsuneo Endoh, Saitama (JP); Akihisa Sato, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 957 days.

(21) Appl. No.: 10/820,818

(22) Filed: Apr. 9, 2004

(65) Prior Publication Data
US 2004/0231330 A1    Nov. 25, 2004

Related U.S. Application Data

(63) Continuation of application No. PCT/JP02/10452, filed on Oct. 8, 2002, and a continuation of application No. PCT/JP02/10453, filed on Oct. 8, 2002.

(51) Int. Cl.
*F01K 23/10* (2006.01)
(52) U.S. Cl. .............................. 60/618; 60/664; 60/667
(58) Field of Classification Search .................. 60/614, 60/616, 618, 664, 667
See application file for complete search history.

(56) References Cited

U.S. PATENT DOCUMENTS

| | | | |
|---|---|---|---|
| 5,121,607 A * | 6/1992 | George, Jr. | 60/712 |
| 6,494,042 B2 * | 12/2002 | Bronicki | 60/651 |
| 6,981,378 B2 * | 1/2006 | Bronicki | 60/646 |
| 2006/0179841 A1 * | 8/2006 | Sato et al. | 60/645 |
| 2006/0201154 A1 * | 9/2006 | Kato et al. | 60/645 |
| 2006/0242961 A1 * | 11/2006 | Sato et al. | 60/645 |
| 2006/0254276 A1 * | 11/2006 | Sato et al. | 60/645 |

FOREIGN PATENT DOCUMENTS

| | | |
|---|---|---|
| EP | 0 884 550 A2 | 12/1998 |
| JP | 2000-73753 A | 3/2000 |
| JP | 2000-345835 A | 12/2000 |
| JP | 2001-27118 A | 1/2001 |
| JP | 2001-132538 A | 5/2001 |
| JP | 2001-227616 A | 8/2001 |
| WO | 01/53661 A1 | 1/2001 |

* cited by examiner

*Primary Examiner*—Hoang M Nguyen
(74) *Attorney, Agent, or Firm*—Birch, Stewart, Kolasch & Birch, LLP

(57) ABSTRACT

A hybrid vehicle is equipped with an internal combustion engine, a motor/generator, and a Rankine cycle system for recovering thermal energy of exhaust gas. The output of the Rankine cycle system is input into a transmission or, alternatively, converted into electric power and used for charging a battery. The Rankine cycle system has temperature setter that sets the temperature of steam at the outlet of an evaporator. A pressure setter is provided for setting steam pressure at the inlet of an expander. A pressure controller is provided for controlling the steam pressure at the inlet of the expander. The evaporator generates steam to be supplied at a pressure that is optimum for the expansion ratio of the expander. The Rankine cycle system is operated when the vehicle is accelerating or cruising and efficiently recovers thermal energy of the exhaust gas and reduces the fuel consumption of the internal combustion engine.

13 Claims, 24 Drawing Sheets

WHEN TARGET OUTLET STEAM TEMPERATURE IS LOW

WHEN TARGET OUTLET STEAM TEMPERATURE IS HIGH

RANKINE CYCLE SYSTEM AND VEHICLE THEREWITH

This application is a Continuating application of co-pending PCT International Application Nos. PCT/JP02/10452 and PCT/JP02/10453 filed on Oct. 8, 2002, which designated the United States, and with respect to which priority is claimed under 35 U.S.C. § 120. This application claims priority under 35 U.S.C. § 119(a) on Patent Application No(s). 2001-346755 and 2001-348081 filed in Japan on Oct. 9, 2001 and Oct. 10, 2001, respectively, the entire contents of which are hereby incorporated by reference.

FIELD OF THE INVENTION

The present invention relates to a Rankine cycle system that includes an evaporator for generating a gas-phase working medium by heating a liquid-phase working medium using exhaust gas of an internal combustion engine, and a displacement type expander for converting the thermal energy of the gas-phase working medium generated by the evaporator into mechanical energy.

BACKGROUND ART

An arrangement is known from Japanese Patent Application Laid-open No. 2001-27118 wherein, with regard to a Rankine cycle system in which a turbine is driven by heating, with exhaust gas, steam of a coolant for cooling an internal combustion engine, the amount of heat dissipated (amount of heat transferred) from the periphery of a combustion chamber of the internal combustion engine to the coolant is controlled in accordance with- the running conditions of the internal combustion engine so as to optimize the steam temperature at an inlet of the turbine, thereby improving the efficiency.

When the temperature of steam generated by an evaporator of the Rankine cycle system is set low relative to the temperature of the exhaust gas supplied to the evaporator, the difference in temperature between the exhaust gas and the steam increases, the heat exchange efficiency of the evaporator increases, the temperature of the exhaust gas discharged from the evaporator decreases, and the energy of steam thus generated increases (see FIG. 24A). When the temperature of the steam generated by the evaporator is set high relative to the temperature of the exhaust gas supplied to the evaporator, the difference in temperature between the exhaust gas and the steam decreases, the heat exchange efficiency of the evaporator decreases, the temperature of the exhaust gas discharged from the evaporator increases, and the energy of the steam thus generated decreases (see FIG. 24B). The higher the temperature of the steam supplied from the evaporator, the higher the efficiency of an expander, which is operated by the steam.

That is, as shown in FIG. 24A, when the temperature of the steam generated by the evaporator is set low, the efficiency of the evaporator is high, but the efficiency of the expander is low, and as shown in FIG. 24B, when the temperature of the steam generated by the evaporator is set high, although the efficiency of the evaporator is low, the efficiency of the expander is high. There is therefore a steam temperature at which the overall efficiency, which takes into consideration the efficiency of the evaporator and the efficiency of the expander, becomes a maximum. Moreover, the efficiency of a displacement type expander depends not only on the steam temperature, but also on a steam pressure at which the efficiency, which depends on the expansion ratio and the leakage of the expander, becomes a maximum.

DISCLOSURE OF THE INVENTION

The present invention has been achieved under the above-mentioned circumstances, and an object thereof is to improve the performance of a Rankine cycle system by increasing the overall efficiency of an evaporator and an expander.

In order to achieve this object, in accordance with a first aspect of the present invention, there is proposed a Rankine cycle system that includes an evaporator for generating a gas-phase working medium by heating a liquid-phase working medium using exhaust gas of an internal combustion engine, and a displacement type expander for converting the thermal energy of the gas-phase working medium generated by the evaporator into mechanical energy, characterized in that the Rankine cycle system further includes temperature setting means for setting the temperature of the gas-phase working medium at the outlet of the evaporator based on the temperature and the flow rate of the exhaust gas at the inlet of the evaporator, temperature control means for controlling the temperature of the gas-phase working medium at the outlet of the evaporator so that the temperature is at the set temperature set by the temperature setting means, pressure setting means for setting the pressure of the gas-phase working medium at the inlet of the expander based on the set temperature, and pressure control means for controlling the pressure of the gas-phase working medium at the inlet of the expander so that the pressure is at the set pressure set by the pressure setting means.

In accordance with this arrangement, since the set temperature for the gas-phase working medium at the outlet of the evaporator is calculated based on the temperature and the flow rate of the exhaust gas at the inlet of the evaporator, and the temperature of the gas-phase working medium at the outlet of the evaporator is controlled so that it is at this set temperature, it is possible to generate a gas-phase working medium having a temperature at which the overall efficiency becomes a maximum, the overall efficiency taking into consideration both the efficiency of the evaporator and the efficiency of the expander, which change depending on the temperature of the gas-phase working medium at the outlet of the evaporator. Furthermore, since the set pressure for the gas-phase working medium at the inlet of the expander is calculated based on the above set temperature, and the pressure of the gas-phase working medium at the inlet of the expander is controlled so that it is at the set pressure, the efficiency of the expander can be improved by supplying the gas-phase working medium at a pressure that is optimum for the expansion ratio of the expander.

Furthermore, in accordance with a second aspect of the present invention, in addition to this first aspect, there is proposed a Rankine cycle system wherein the temperature control means controls the temperature of the gas-phase working medium by the amount of liquid-phase working medium supplied to the evaporator, and the pressure control means controls the pressure of the gas-phase working medium by the rotational speed of the expander.

In accordance with this arrangement, since the temperature of the gas-phase working medium is controlled by the amount of liquid-phase working medium supplied to the evaporator, the temperature of the gas-phase working medium can be controlled appropriately and, moreover, since the pressure of the gas-phase working medium is controlled by the rotational speed of the expander, the pressure of the gas-phase working medium can be controlled appropriately.

Water and steam of embodiments correspond to the liquid-phase working medium and the gas-phase working medium respectively of the present invention.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein:

FIG. 1 to FIG. 22 illustrate a first embodiment of the present invention;

FIG. 1 is a diagram showing the overall arrangement of a hybrid vehicle;

FIG. 2 is a diagram showing the arrangement of a Rankine cycle system;

FIG. 3 is a flowchart of a main routine;

FIG. 4 is a flowchart of a processing routine when stationary;

FIG. 5 is a flowchart of a processing routine when accelerating;

FIG. 6 is a flowchart of a processing routine when cruising;

FIG. 7 is a flowchart of a processing routine when decelerating;

FIG. 8 is a diagram showing a map for determining stationary, acceleration, cruising, and deceleration states;

FIG. 9 is a diagram showing a map for determining a motor assist region, an internal combustion engine travel region, and a charging region;

FIG. 10 is a diagram showing threshold values for battery charge states;

FIG. 11 is a diagram showing a map for determining an internal combustion engine travel region, a motor-travel region, and the charging region;

FIG. 12 is a time chart showing one example of a vehicle travel pattern;

FIG. 13 is a time chart showing another example of the vehicle travel pattern;

FIG. 14 is a flowchart for explaining running conditions of the Rankine cycle system;

FIG. 16 is a map for looking up a target steam temperature from the energy of the exhaust gas and the overall efficiency;

FIG. 17 is a graph showing the relationship between the temperature and the flow rate of the exhaust gas and the target steam temperature;

FIG. 18 is a map for looking up a target steam flow rate from the energy of the exhaust gas and the target steam temperature;

FIG. 19 is a map for looking up a target steam pressure from the steam temperature and the steam flow rate;

FIG. 20 is a diagram for explaining a method for looking up the target steam pressure from the steam temperature and the steam flow rate;

FIG. 21 is a graph showing the relationship between the inlet pressure and the outlet pressure of the expander; and FIG. 22 is a diagram corresponding to Claims.

BEST MODE FOR CARRYING OUT THE INVENTION

The first embodiment of the present invention is explained with reference to FIG. 1 to FIG. 22.

Figure 1:
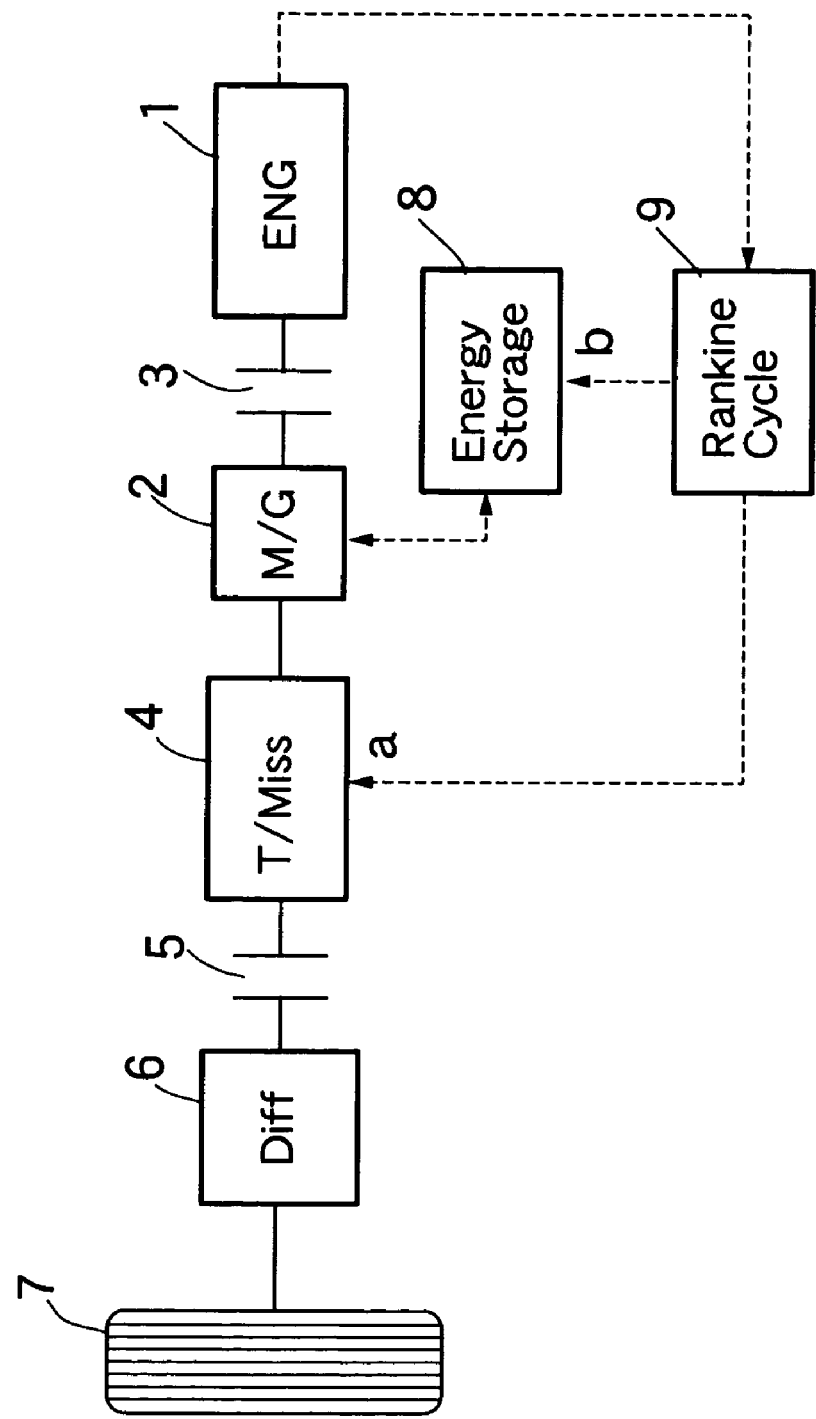

In FIG. 1, a hybrid vehicle includes an internal combustion engine 1 for generating a driving force for travel, the internal combustion engine 1 and a motor/generator 2 are connected in series via a clutch 3, and the motor/generator 2 is further connected to a driven wheel 7 via a transmission 4, a clutch 5, and a differential 6. Therefore, when the internal combustion engine 1 is driven while the clutch 3 is engaged, the driving force is transmitted to the driven wheel 7 via the clutch 3, the motor/generator 2, the transmission 4, the clutch 5, and the differential 6 so as to make the vehicle run. During this process, the motor/generator 2 may be made to run idle, but if the motor/generator 2 is driven by electric power from a battery 8, then the driving force of the internal combustion engine 1 can be assisted by the driving force of the motor/generator 2 and, alternatively, if the motor/generator 2 its driven by the driving force of the internal combustion engine 1 so as to make the motor/generator 2 function as a generator, then the battery 8 can be charged. Furthermore, if the clutch 3 is disengaged during deceleration of the vehicle and the motor/generator 2 is driven by a driving force that is transmitted back from the driven wheel 7, then the battery 8 can be charged by regenerative electric power generated by the motor/generator 2.

The vehicle includes a Rankine cycle system 9 that is operated by waste heat of the internal combustion engine 1, and the driving force output by the Rankine cycle system 9 is input into the transmission 4 (see arrow a). The transmission 4 combines, by means of, for example, a planetary gear train, the driving force generated by the Rankine cycle system 9 and the driving force generated by the internal combustion engine 1 or the motor/generator 2, and transmits it to the driven wheel 7.

Figure 2:
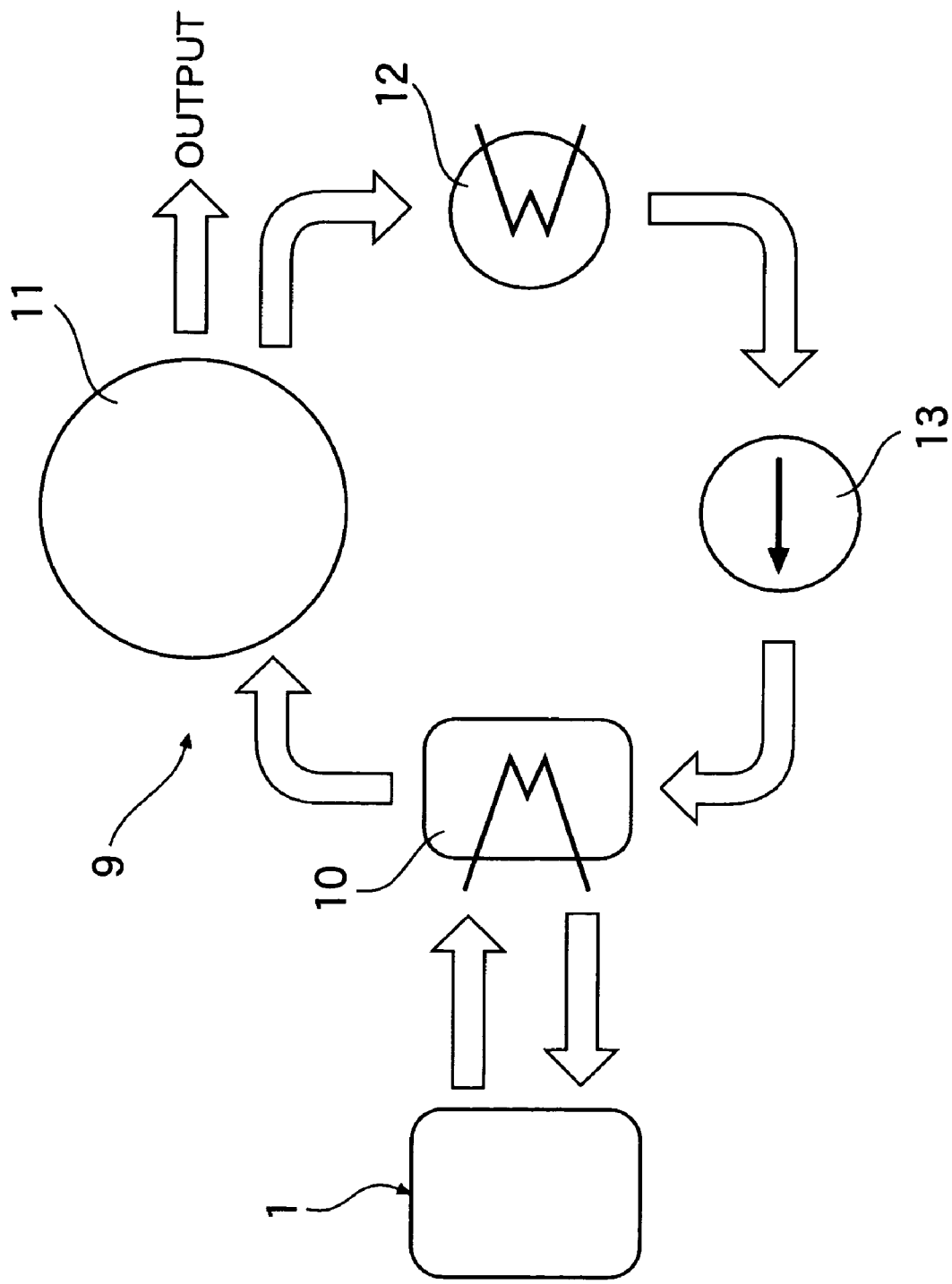

As shown in FIG. 2, the Rankine cycle system 9 has a known arrangement, and includes an evaporator 10 for generating high temperature, high pressure steam using as a heat source waste heat, for example, exhaust gas, of the internal combustion engine 1, an expander 11 for generating a shaft output by expansion of the high temperature, high pressure steam, a condenser 12 for condensing decreased temperature, decreased pressure steam discharged from the expander 11 so as to turn it back into water, and a water supply pump 13 for supplying the water from the condenser 12 to the evaporator 10.

Control of the internal combustion engine 1, the motor/generator 2, and the Rankine cycle system 9 is now explained with reference to the flowcharts. The internal combustion engine 1, the motor/generator 2, and the Rankine cycle system 9 are controlled by an electronic control unit based on outputs from a vehicle speed sensor, a vehicle acceleration sensor, a degree of throttle opening sensor, a battery voltage sensor, a battery current sensor, etc.

Figure 3:
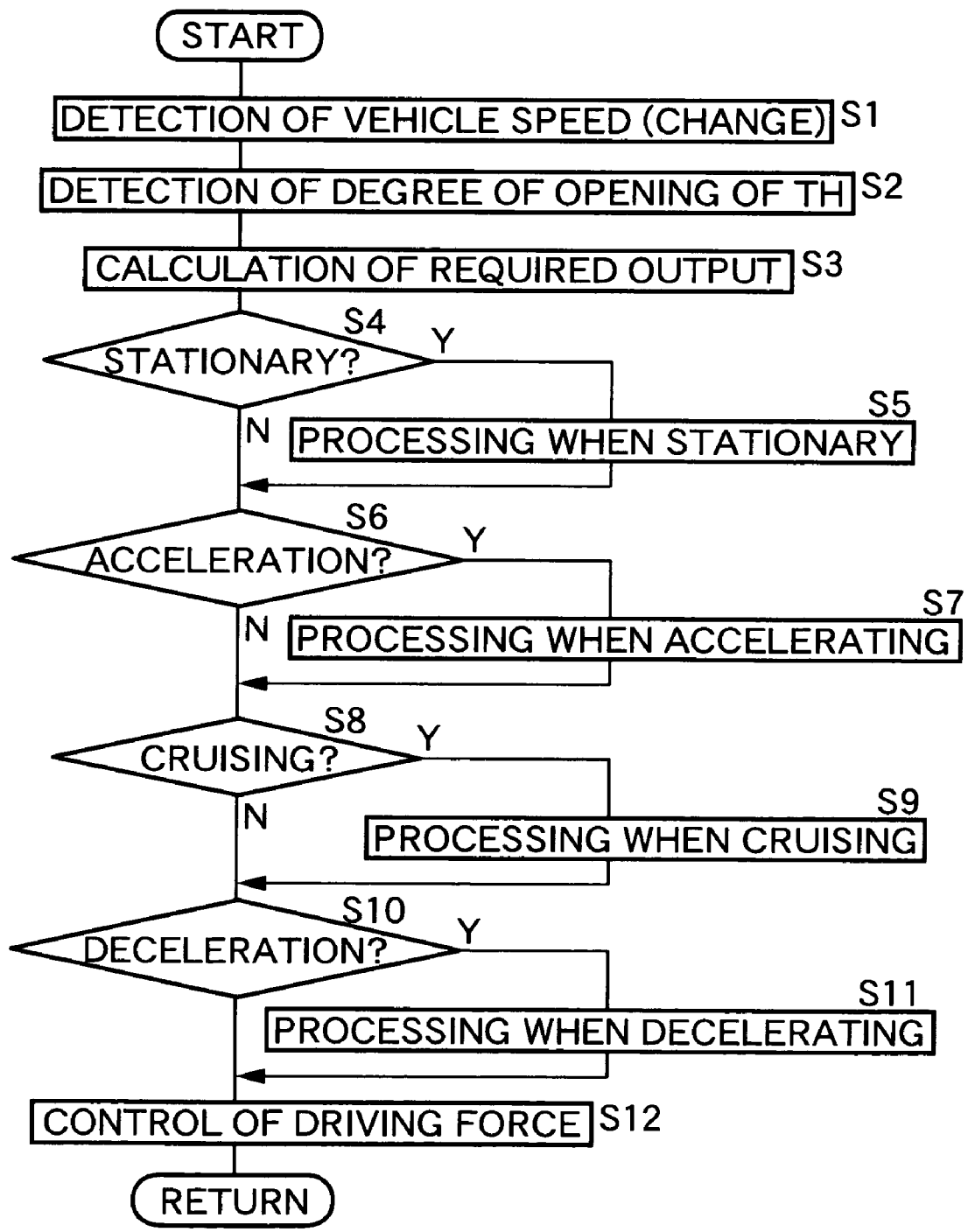

Firstly, in Step S1 of a main routine of FIG. 3, the vehicle speed and changes in the vehicle speed (vehicle acceleration and vehicle deceleration) are detected, in Step S2 the degree of opening of the throttle is detected, and in Step S3 a required vehicle output is calculated from the vehicle speed and the degree of opening of the throttle. If in a subsequent Step S4 the vehicle is in a stationary state, then in Step S5 processing when stationary, which will be described later, is carried out, if in Step S6 the vehicle is in an acceleration state, then in Step S7 processing when accelerating, which will be described later, is carried out, if in Step S8 the vehicle is in a cruising state, then in Step S9 processing when cruising, which will be described later, is carried out, and if in Step S10 the vehicle is in a deceleration state, then in Step S11 processing when decelerating, which will be described later, is carried out. In Step S12, control of the driving forces of the internal combustion engine 1, the motor/generator 2, and the Rankine cycle system 9 is carried out in accordance with processing when stationary, processing when accelerating, processing when cruising, and processing when decelerating.

Figure 8:
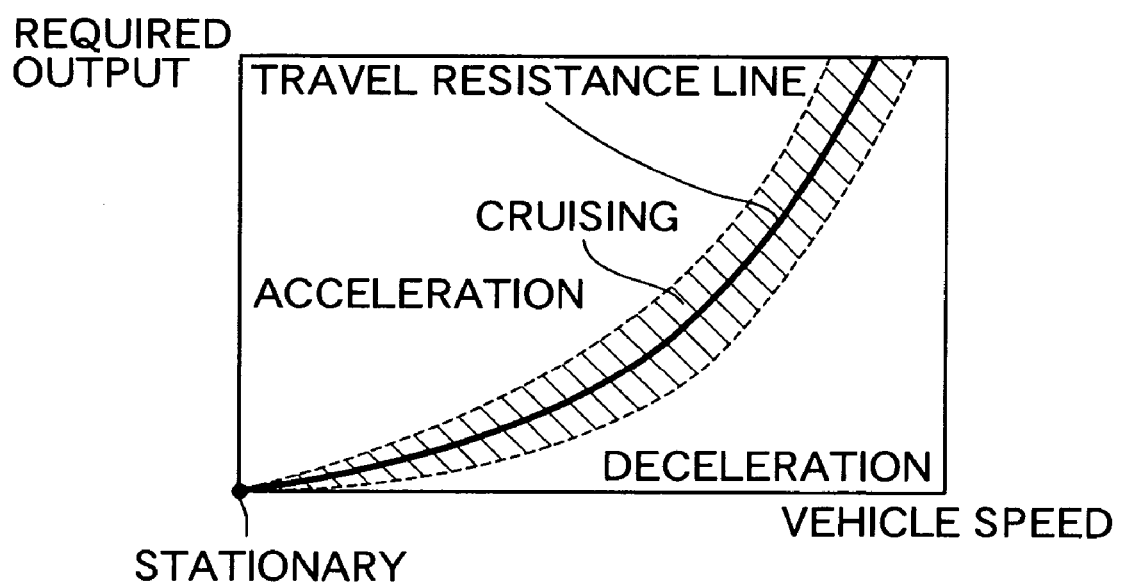

Whether the vehicle is in the stationary state, the acceleration state, the cruising state, or the deceleration state is determined based on the map shown in FIG. 8. The map shown in FIG. 8 is plotted with the vehicle speed as the abscissa and the required output as the ordinate, and a parabolic travel resistance line is determined. If both the vehicle speed and the required output are 0, it is determined that the vehicle is in the stationary state; if the vehicle speed and the required output are in the hatched region in the vicinity of the travel resistance line, then it is determined that the vehicle is in the cruising state; if the vehicle speed and the required output are on the upper side of the hatched region, then it is determined that the vehicle is in the acceleration state; and if the vehicle speed and the required output are on the lower side of the hatched region, then it is determined that the vehicle is in the deceleration state. Other than the map above, if the vehicle speed is substantially constant on an uphill route, then the vehicle is considered to be in the acceleration state, if the vehicle speed is substantially constant on a downhill route, then the vehicle is considered to be in the deceleration state, and if the absolute value of the vehicle acceleration or the vehicle deceleration is a predetermined value or less, then the vehicle is considered to be in the cruising state.

Figure 4:
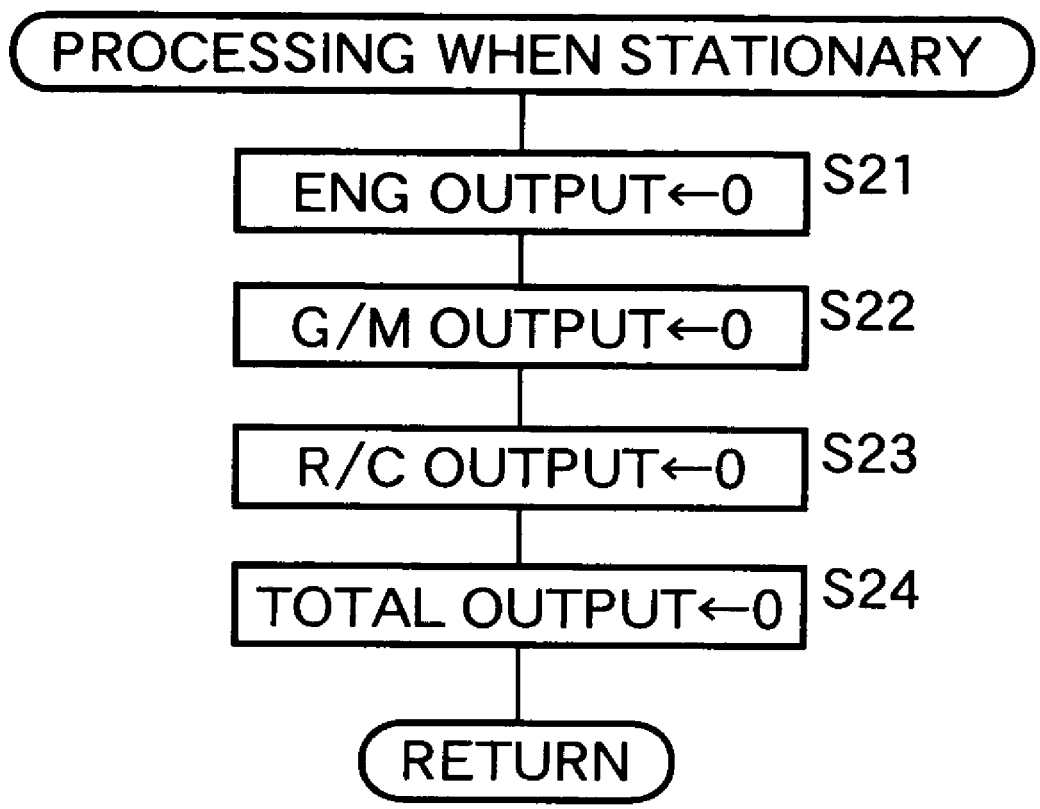

A sub-routine of Step S5 (control when stationary) is now explained with reference to the flowchart of FIG. 4.

Firstly, in Step S21 the output of the internal combustion engine 1 is set at 0 (stopped), in Step S22 the output of the motor/generator 2 is set at 0, in Step S23 the output of the Rankine cycle system 9 is set at 0 and, accordingly, in Step S24 the total output of the internal combustion engine 1, the motor/generator 2, and the Rankine cycle system 9 is set at 0. In this way, by stopping all of the internal combustion engine 1, the motor/generator 2, and the Rankine cycle system 9 when the vehicle is stationary, the fuel consumption can be reduced. When starting the internal combustion engine 1, which has been stopped, the motor/generator 2 is used as a starter motor.

Figure 5:
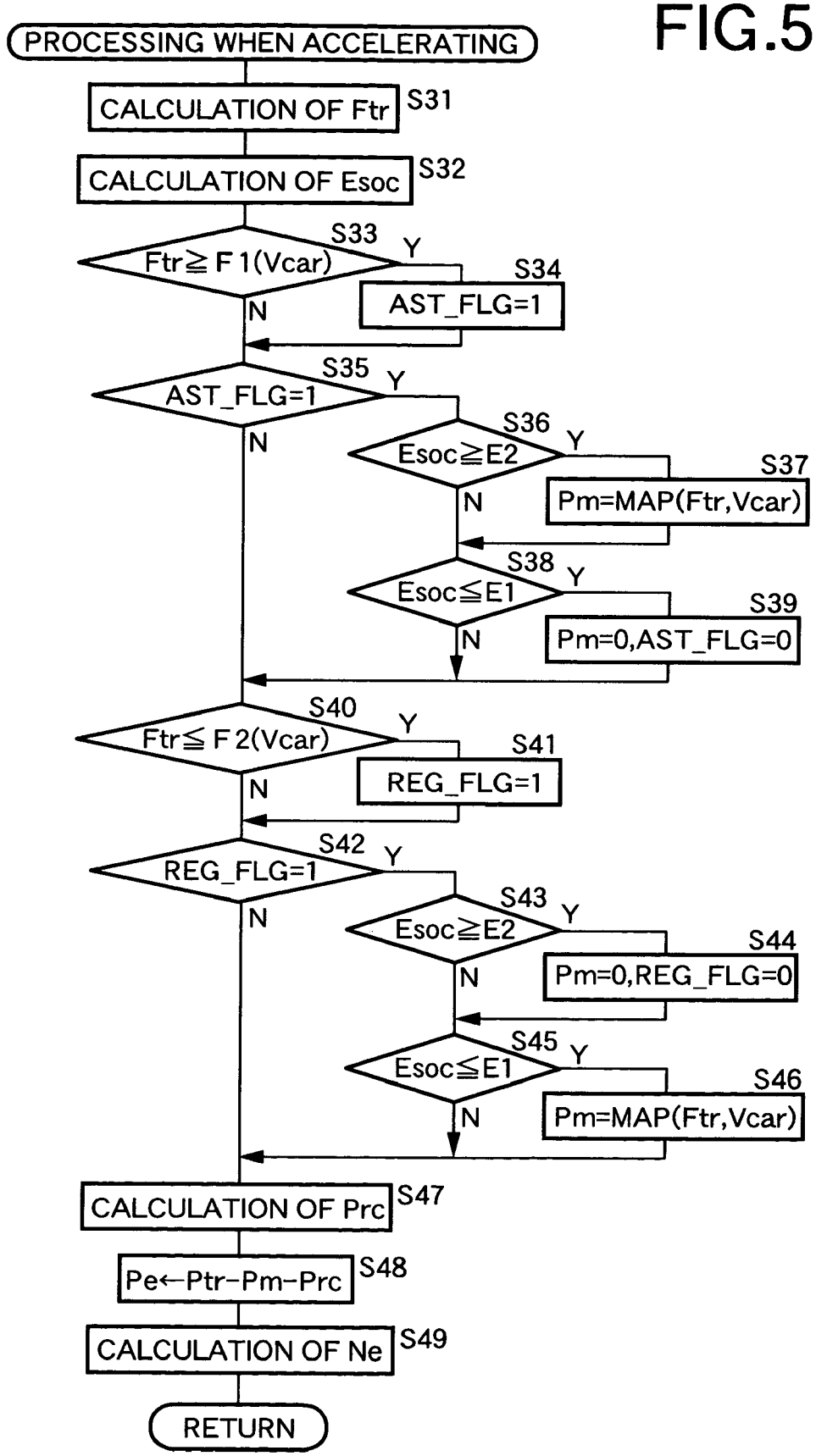

A sub-routine of Step S7 (control when accelerating) is now explained based on the flowchart of FIG. 5.

Figure 9:
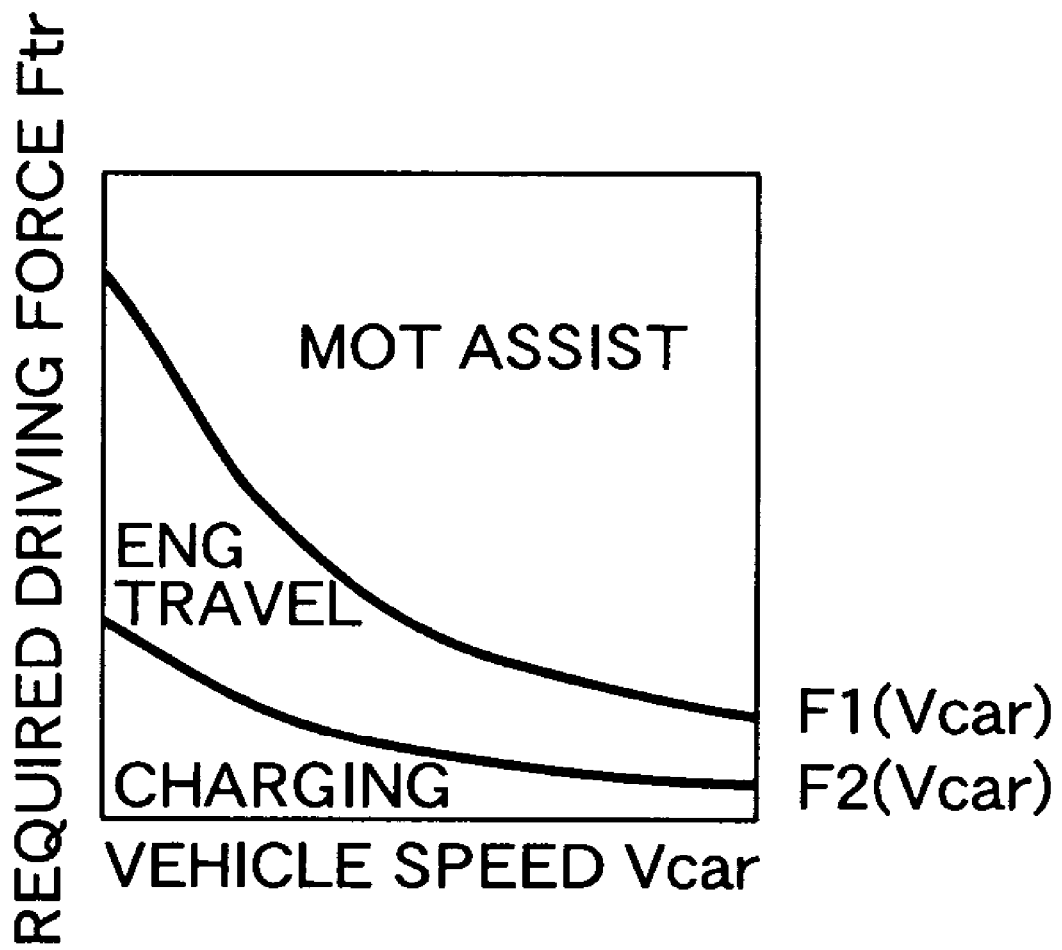

Firstly, in Step S31 a required driving force Ftr for the vehicle is calculated from the vehicle speed and the degree of opening of the throttle, and in Step S32 the remaining battery capacity Esoc is calculated from the battery voltage and the battery current. In a subsequent Step S33, the required driving force Ftr is applied to the map of FIG. 9, and it is determined whether the present running conditions are in the motor assist region, the internal combustion engine travel region, or the charging region. The map of FIG. 9 is plotted with vehicle speed Vcar as the abscissa and the required driving force Ftr as the ordinate, and a first threshold value F1 (Vcar) and a second threshold value F2 (Vcar), which decline as they go to the right, are set therein. In Step S33 above, if the required driving force Ftr is equal to or greater than the first threshold value F1 (Vcar), then it is determined that the vehicle is in the motor assist region, and in Step S34 an assist permission flag AST_FLG is set to '1'.

Figure 10:
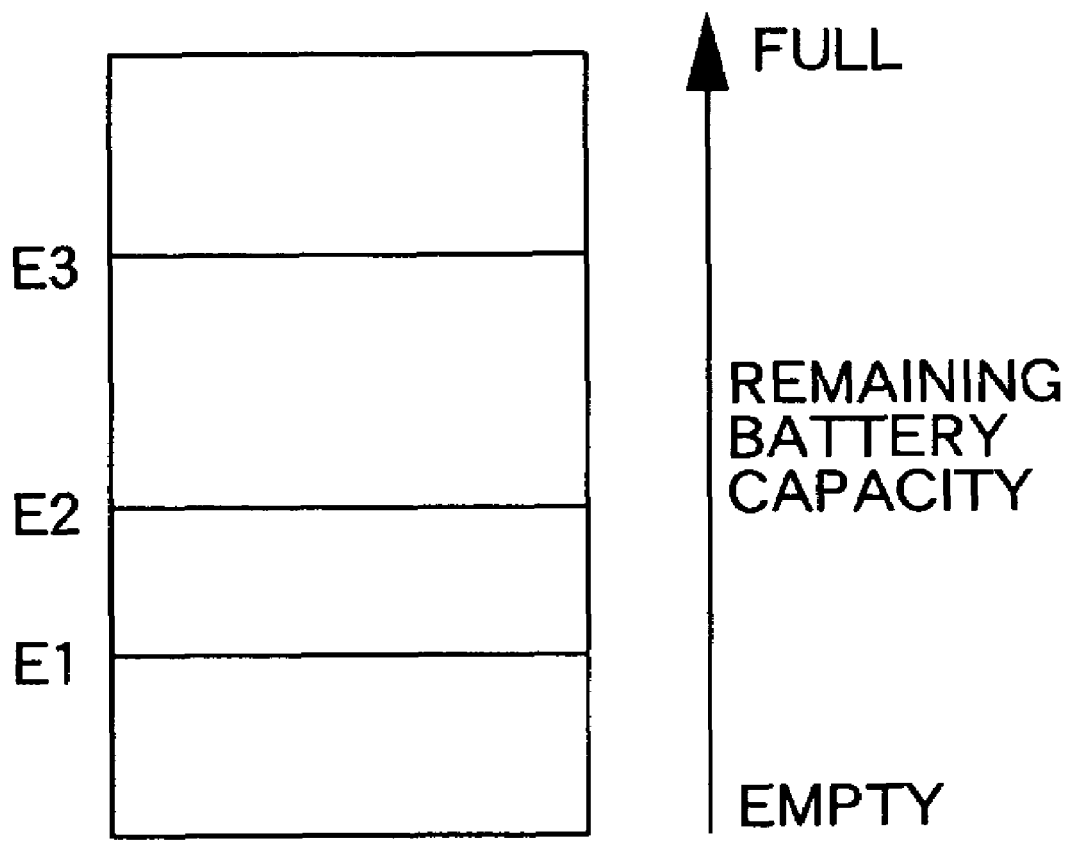

When the assist permission flag AST_FLG is set at '1' in a subsequent Step S35, that is, when the required driving force Ftr cannot be satisfied by the internal combustion engine 1 alone, and if in Step S36 the remaining battery capacity Esoc is equal to or greater than a second threshold value E2 of FIG. 10 and the motor/generator 2 can assist the driving force, then in Step S37 an amount of assist Pm that is to be generated by the motor/generator 2 is determined according to the required driving force Ftr and the vehicle speed Vcar by map lookup. Furthermore, if in Step S38 the remaining battery capacity Esoc is equal to or less than a first threshold value E1 of FIG. 10 and the motor/generator 2 is unable to assist the driving force, then in Step S39 the amount of assist Pm that is to be generated by the motor/generator 2 is set at 0 and the assist permission flag AST_FLG is reset to '0'.

In a subsequent Step S40, if the required driving force Ftr is equal to or less than the second threshold value F2 (Vcar) shown in FIG. 9, then it is determined that the vehicle is in the charging region, and in Step S41 a power generation permission flag REG_FLG is set to '1'.

When the power generation permission flag REG_FLG is set at '1' in a subsequent Step S42, and if in Step S43 the remaining battery capacity Esoc is equal to or greater than the second threshold value E2 of FIG. 10 and there is no need to charge the battery 8, then in Step S44 the amount of power generation Pm that is to be generated by the motor/generator 2 is set at 0 and the power generation permission flag REG_FLG is reset to '0'. In Step S45, if the remaining battery capacity Esoc is equal to or less than the first threshold value E1 of FIG. 10 and there is a need to charge the battery 8, then in Step S46 the amount of power generation Pm that is to be generated by the motor/generator 2 is determined according to the required driving force Ftr and the vehicle speed Vcar by map lookup.

In a subsequent Step S47, a Rankine cycle output Prc, which is the output of the Rankine cycle system 9, is calculated from the running conditions of the internal combustion engine 1, in Step S48 a target internal combustion engine output Pe is calculated by subtracting, from the required driving force Ftr, the amount of assist Pm of the motor/generator 2 (or the amount of power generation Pm of the motor/generator 2, which is a negative value) and the Rankine cycle output Prc, and in Step S49 a rotational speed Ne of the internal combustion engine 1 for obtaining the target internal combustion engine output Pe with a minimum fuel consumption is calculated.

In this way, when the required driving force Ftr is large during acceleration of the vehicle, the driving force of the internal combustion engine 1 is assisted by the driving force of the motor/generator 2 provided that the remaining battery capacity Esoc is sufficient, and when the required driving force Ftr is small during acceleration of the vehicle, the battery 8 is charged by driving the motor/generator 2 using the driving force of the internal combustion engine 1 provided that the battery 8 is not overcharged, and it is therefore possible to improve the acceleration performance of the vehicle and charge the battery 8 in readiness for cruising subsequent to the acceleration.

Furthermore, since the Rankine cycle system 9 is operated during acceleration of the vehicle when the temperature of the exhaust gas of the internal combustion engine 1 reaches a predetermined value or higher and the flow rate of the exhaust gas of the internal combustion engine 1 reaches a predetermined value or higher, the Rankine cycle system 9 can be run with high efficiency, the thermal energy of the exhaust gas can be recovered effectively, and the fuel consumption of the internal combustion engine 1 can be reduced effectively.

A sub-routine of Step S9 (control when cruising) is now explained with reference to the flowchart of FIG. 6.

Firstly, in Step S51 the required output Ptr of the vehicle is calculated from the vehicle speed and the degree of opening of the throttle, and in Step S52 the remaining battery capacity Esoc is calculated from the battery voltage and the battery current. In a subsequent Step S53 if the remaining battery capacity Esoc is equal to or greater than the second threshold value E2 of FIG. 10, then it is determined that traveling by means of the motor/generator 2 is possible, and in Step S54 a discharge permission flag DCH_FLG is set to '1'.

Figure 11:
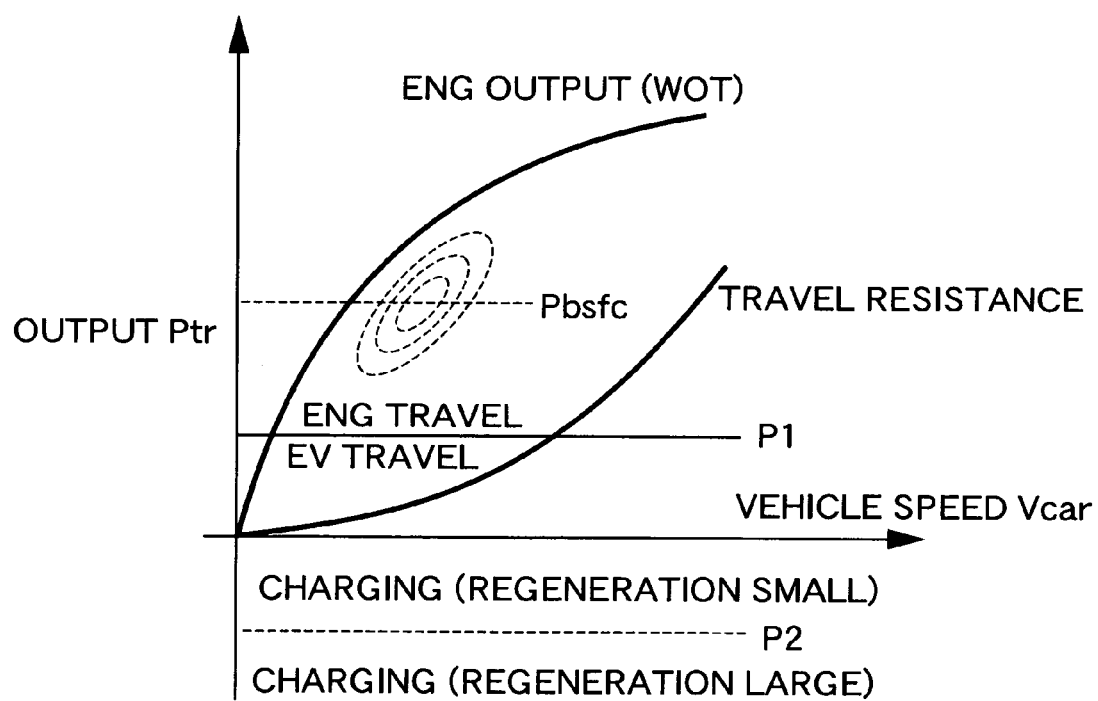

When the discharge permission flag DCH_FLG is set at '1' in a subsequent Step S55, and if in Step S56 the required output Ptr is equal to or less than the threshold value P1 of FIG. 11 and traveling by means of the output of the motor/generator 2 alone is possible, then in Step S57 the motor output Pm that is to be generated by the motor/generator 2 is made equal to the required output Ptr, and the internal combustion engine 1 is stopped. Furthermore, in Step S58, if the required output Ptr exceeds the threshold value P1 of FIG. 11 and traveling by means of the output of the motor/generator 2 alone is impossible, then in Step S59 the motor output Pm that is to be generated by the motor/generator 2 is set based on the vehicle speed Vcar and the required output Ptr, and a value obtained by subtracting the motor output Pm from the required output Ptr is defined as a target internal combustion engine output Pe.

In a subsequent Step S60, if the remaining battery capacity Esoc is less than the first threshold value E1 of FIG. 10, then it is determined that it is necessary to generate power by means of the internal combustion engine 1, and in Step S61 the power generation permission flag REG_FLG is set to '1'.

When the power generation permission flag REG_FLG is set at '1' in a subsequent Step S62, and if in Step S63 the required output Ptr is less than a set value Pbsfc (the output at which the efficiency of the internal combustion engine 1 becomes a maximum) of FIG. 11, then in Step S64 the amount of power generation Pm that is to be generated by the motor/generator 2 is set at a value obtained by subtracting the required output Ptr from the set value Pbsfc, and the battery 8 is charged by driving the motor/generator 2 with the amount of power generation Pm, which is a part of the set value Pbsfc output by the internal combustion engine 1. Furthermore, if in Step S65 the remaining battery capacity Esoc is equal to or greater than the second threshold value E2 of FIG. 10 and there is no need to charge the battery 8, in Step S66 the amount of power generation Pm that is to be generated by the motor/generator 2 is set at 0 and the power generation permission flag REG_FLG is reset to '0'.

In a subsequent Step S67, the Rankine cycle output Prc, which is the output of the Rankine cycle system 9, is calculated from the running conditions of the internal combustion engine 1, in Step S68 the target internal combustion engine output Pe is calculated by subtracting, from the required driving force Ftr, the motor output Pm (or the amount of power generation Pm of the motor/generator 2, which is a negative value) of the motor/generator 2 and the Rankine cycle output Prc, and in Step S69 the rotational speed Ne of the internal combustion engine 1 for obtaining the target internal combustion engine output Pe with a minimum fuel consumption is calculated.

In this way, when the remaining battery capacity Esoc is sufficient when the vehicle is cruising, if the required output Ptr is large, then the vehicle is made to travel by the combined use of the driving force of the internal combustion engine 1 and the driving force of the motor/generator 2, and if the required output Ptr is small, then the internal combustion engine 1 is stopped and the vehicle is made to travel by the driving force of the motor/generator 2 alone, thereby minimizing the fuel consumption. When the remaining battery capacity Esoc is insufficient while the vehicle is cruising, the battery 8 can be charged by driving the motor/generator 2 with the driving force of the internal combustion engine 1.

Since the Rankine cycle system 9 is operated when the vehicle is cruising, at which time the temperature of the exhaust gas of the internal combustion engine 1 is equal to or greater than a predetermined value and the flow rate of the exhaust gas of the internal combustion engine 1 is equal to or greater than a predetermined value, it is possible to run the Rankine cycle system 9 with high efficiency so as to recover the thermal energy of the exhaust gas effectively and reduce the fuel consumption of the internal combustion engine 1 effectively.

Figure 7:
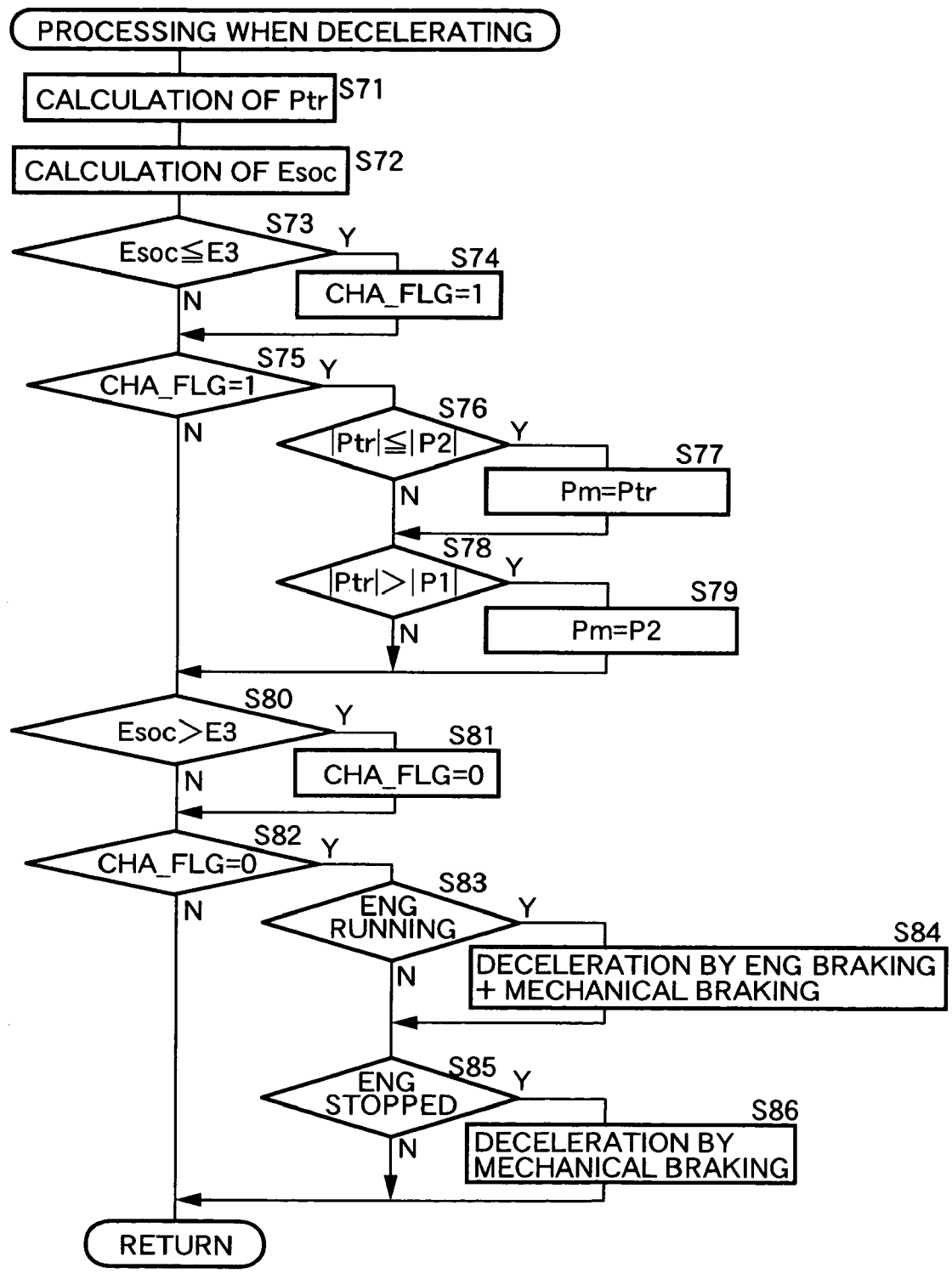

A sub-routine of the above Step S11 (control when decelerating) is now explained with reference to the flowchart of FIG. 7.

Firstly, in Step S71 the required output of the vehicle, that is, the required regenerative output Ptr, is calculated from the vehicle speed and the degree of opening of the throttle, and in Step S72 the remaining battery capacity Esoc is calculated from the battery voltage and the battery current. In a subsequent Step S73, if the remaining battery capacity Esoc is equal to or less than a third threshold value E3 of FIG. 10, it is determined that charging of the battery 8 by regenerative electric power is possible, and in Step S74 the charge permission flag CHA_FLG is set to '1'.

When the charge permission flag CHA_FLG is set at '1' in a subsequent Step S75, and if in Step S76 the absolute value of the required regenerative output Ptr is equal to or less than the absolute value of the threshold value P2 of FIG. 11, then in Step S77 the regenerative output Pm of the motor/generator 2 is made equal to the required regenerative output Ptr. If in Step S78 the absolute value of the required regenerative output Ptr exceeds the absolute value of the threshold value P2 of FIG. 11, then in Step S79 the regenerative output Pm of the motor/generator 2 is set at the threshold value P2.

In a subsequent Step S80, if the remaining battery capacity Esoc exceeds the third threshold value E3 of FIG. 10, then it is determined that the battery 8 is in a state in which it cannot be charged any further, and in Step S81 the charge permission flag CHA_FLG is reset to '0'.

When the charge permission flag CHA_FLG has been reset to '0' in a subsequent Step S82, and if in Step S83 the internal combustion engine 1 is running, then in Step S84 the vehicle is decelerated by engine braking and mechanical braking without regenerative braking. Furthermore, if in Step S85 the internal combustion engine 1 is stopped, then in Step S86, the vehicle is decelerated by mechanical braking.

In this way, provided that there is no possibility that the battery 8 will be overcharged when the vehicle is decelerating, regenerative braking is carried out by the motor/generator 2 so as to charge the battery 8 by regenerative electric power. If there is a possibility that the battery 8 might be overcharged, then the regenerative braking is not allowed and the vehicle is decelerated by engine braking and mechanical braking, and it is therefore possible to ensure that the remaining battery capacity Esoc is a maximum while minimizing the fuel consumption.

Figure 12:
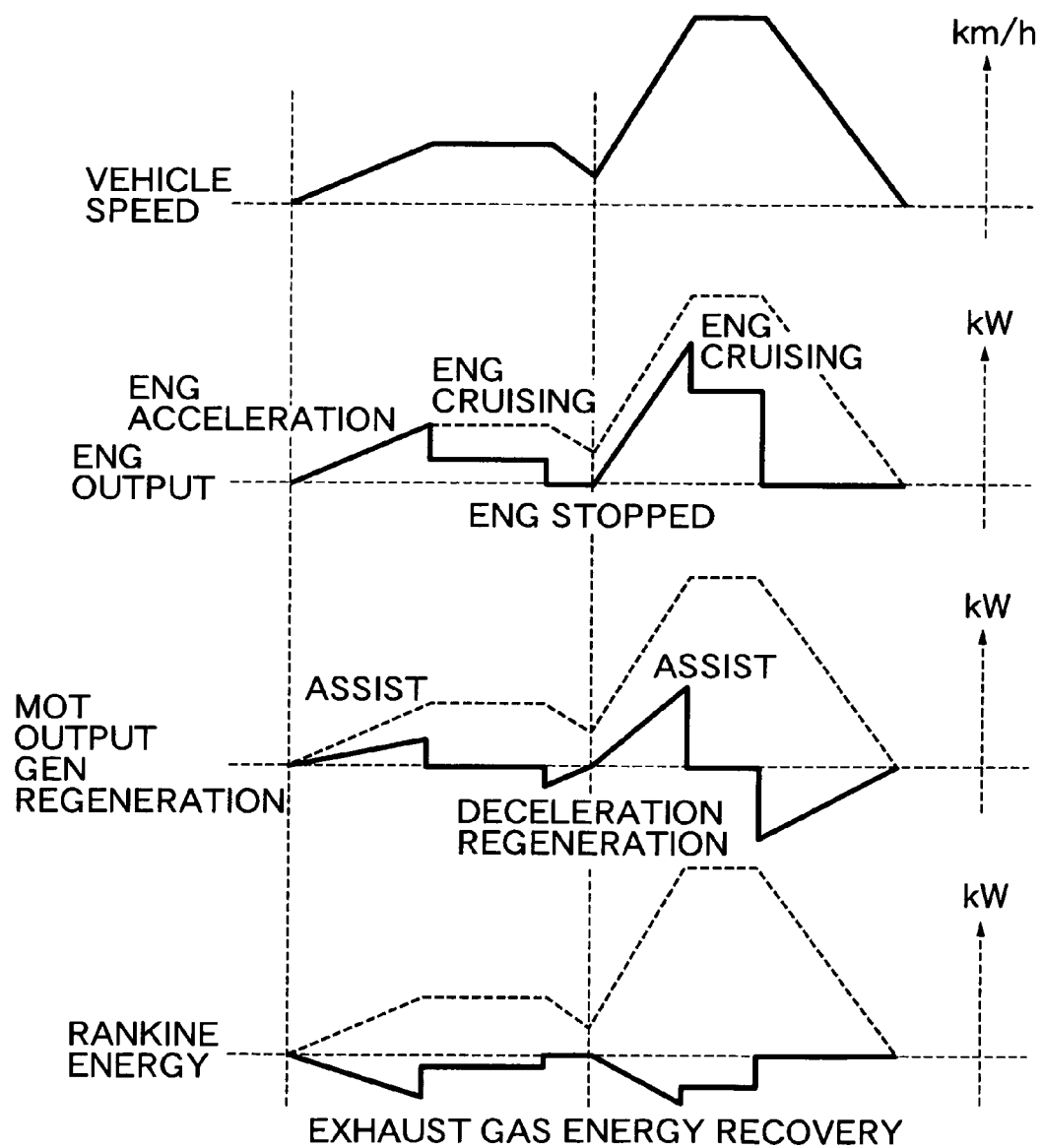

FIG. 12 shows one example of a vehicle travel pattern. The vehicle is made to travel by the combined use of the driving force of the internal combustion engine 1 and the driving force of the motor/generator 2 when accelerating and by the driving force of the internal combustion engine 1 when cruising, and when decelerating the internal combustion engine 1 is stopped and the battery 8 is charged by the regenerative electric power of the motor/generator 2. Both during acceleration of the vehicle and during cruising, the output of the Rankine cycle system 9 assists the driving force of the internal combustion engine 1.

Figure 13:
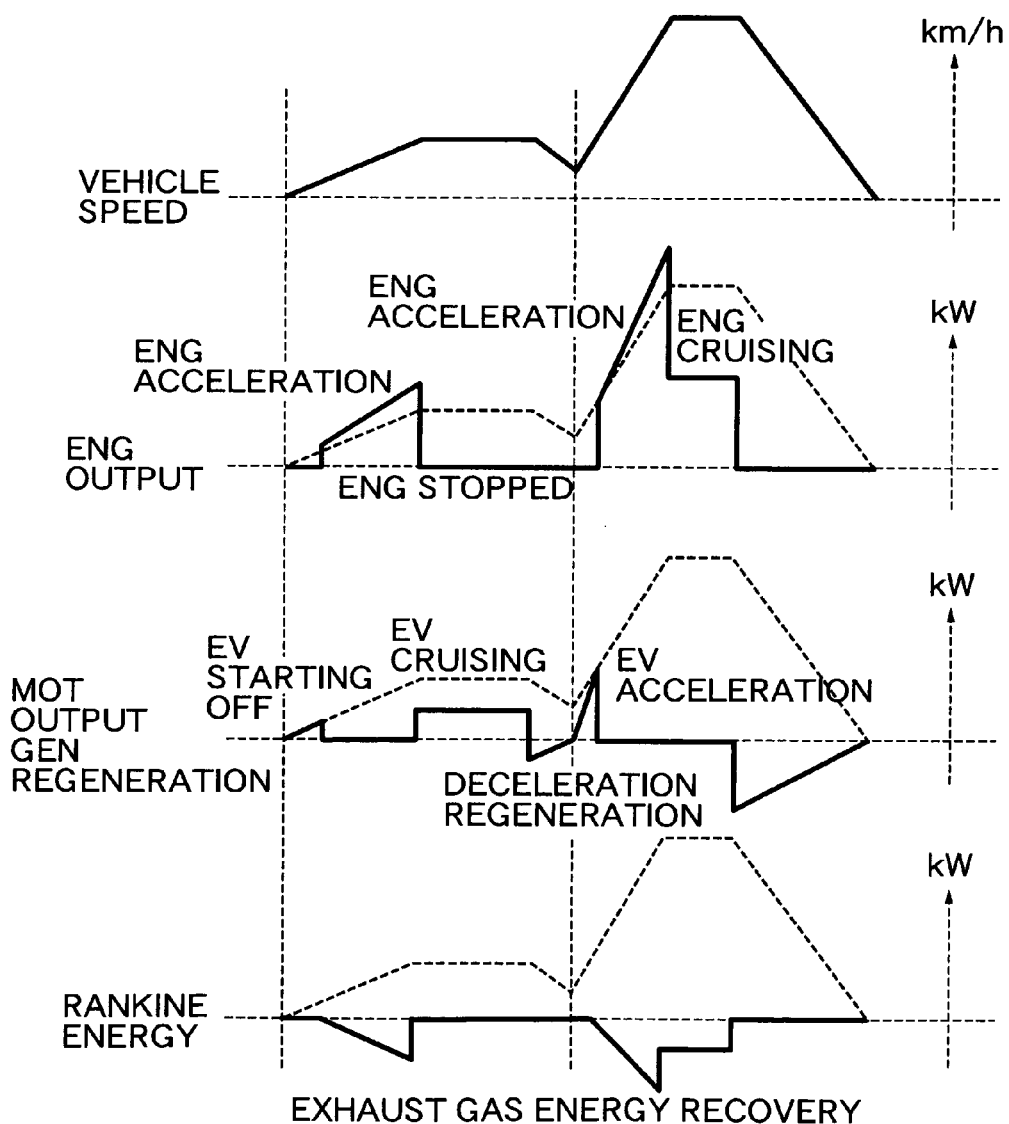

FIG. 13 shows another example of the vehicle travel pattern. When the vehicle starts off, the motor/generator 2, which is able to output a large low-speed torque, is used; when accelerating, the vehicle is made to travel by the driving force of the internal combustion engine 1; when cruising, the vehicle is made to travel by the driving force of the motor/generator 2; and when decelerating, the internal combustion engine 1 is stopped and the battery 8 is charged by the regenerative electric power of the motor/generator 2. Both when the vehicle is accelerating and when it is cruising, the output of the Rankine cycle system 9 assists the driving force of the internal combustion engine 1.

Optimum control of running conditions of the Rankine cycle system 9 is now explained.

Figure 22:
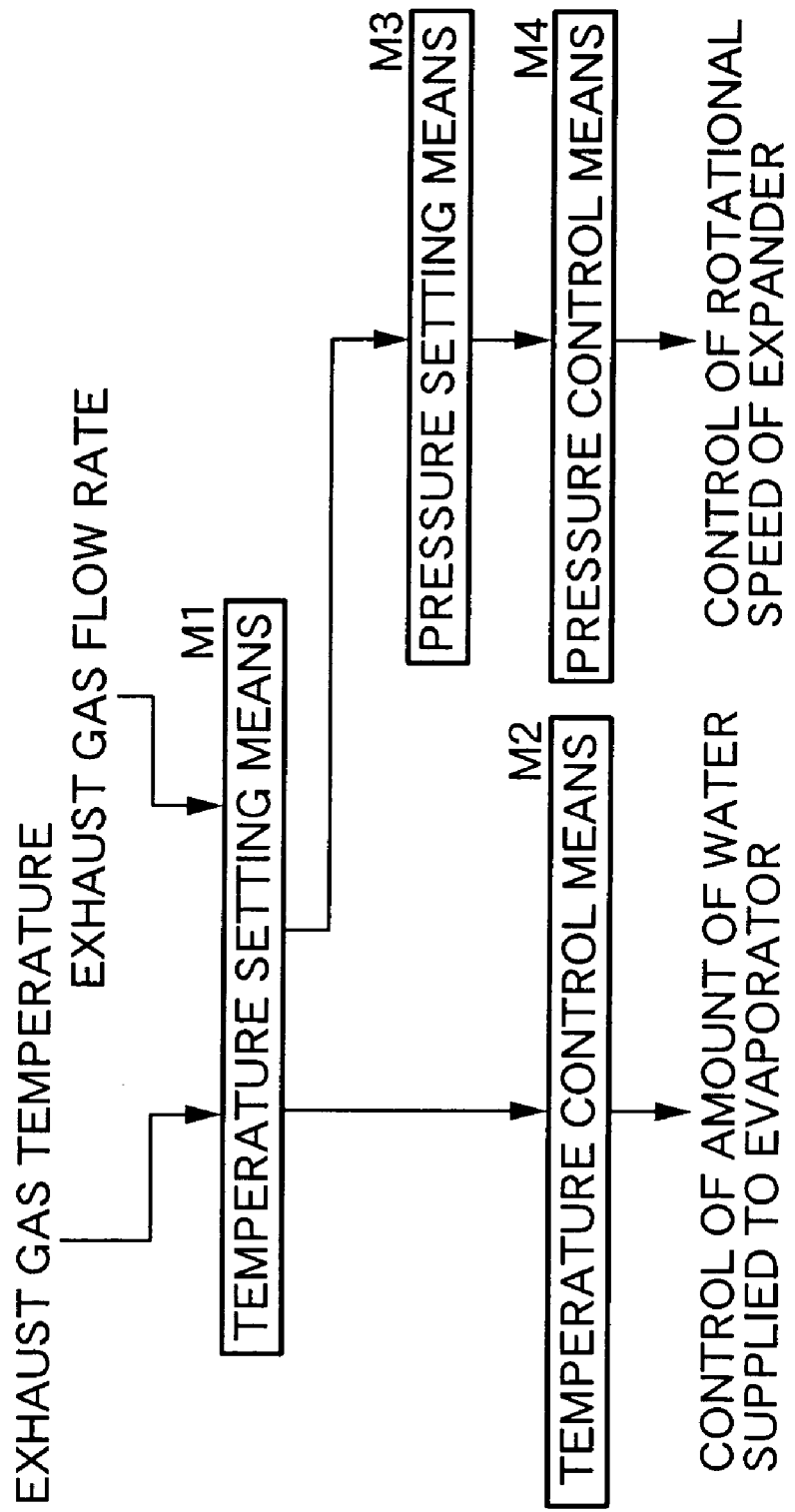

As shown in the diagram of FIG. 22, which corresponds to Claims, a control system for the running conditions of the Rankine cycle system 9 comprises temperature setting means M1 for setting the steam temperature at the outlet of the evaporator 10 based on the temperature and the flow rate of the exhaust gas at the inlet of the evaporator 10, temperature control means M2 for controlling the steam temperature at the outlet of the evaporator 10 so that it is at the set temperature, pressure setting means M3 for setting the steam pressure at the inlet of the expander 11 based on the set temperature, and pressure control means M4 for controlling the steam pressure at the inlet of the expander 11 so that it is at the set pressure.

Figure 14:
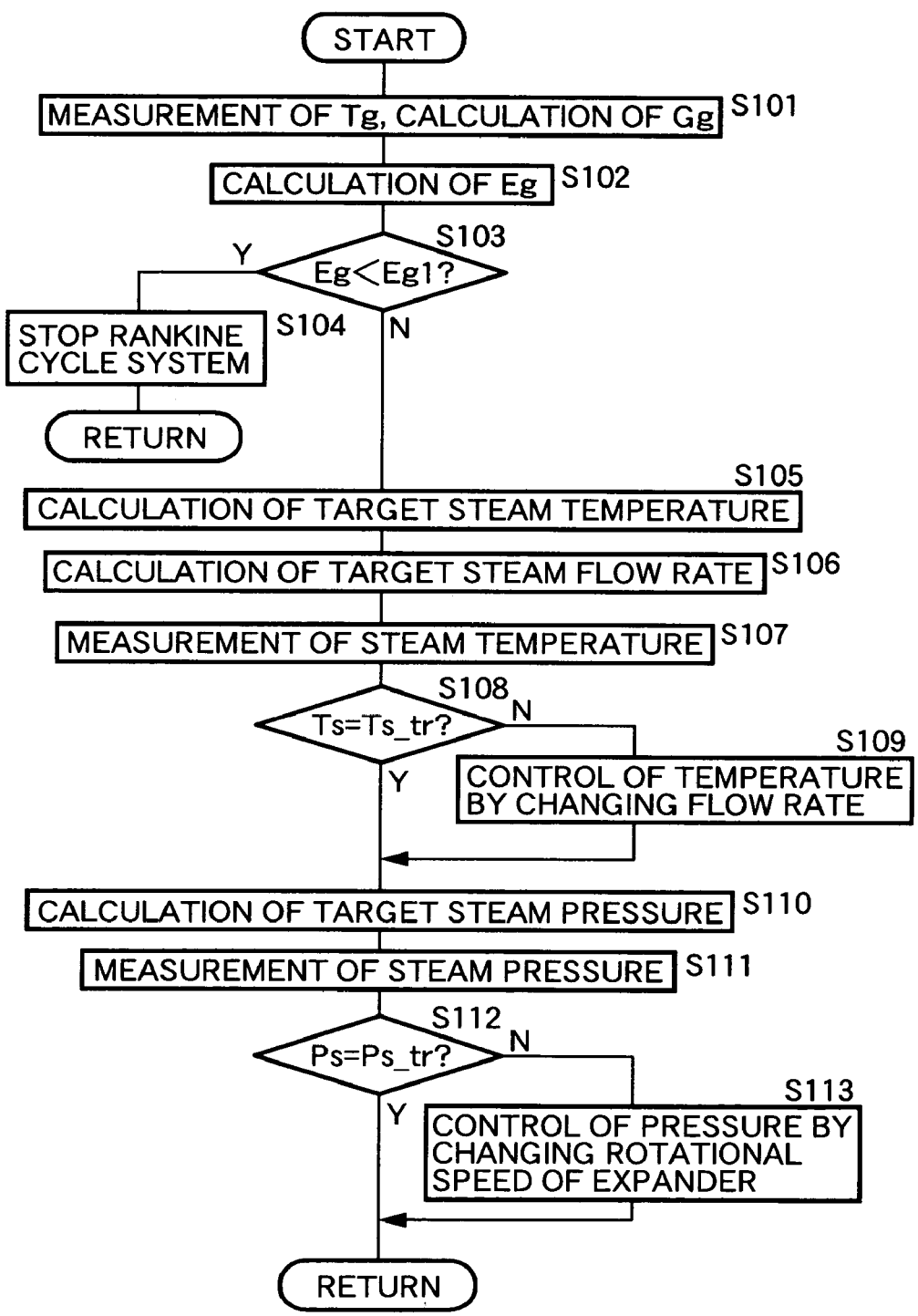

Operation of the control system for the running conditions of the Rankine cycle system 9 is now explained with reference to the flowchart of FIG. 14.

Firstly, in Step S101 a temperature Tg of the exhaust gas at the inlet of the evaporator 10 is detected and a flow rate Gg of the exhaust gas is calculated. The flow rate Gg of the exhaust gas can be calculated, using a flow rate Gf of the fuel and an air/fuel ratio A/F, from $Gg=Gf\times(1+A/F)$.

In a subsequent Step S102, an energy Eg of the exhaust gas is calculated, using the flow rate Gg of the exhaust gas and an enthalpy Hg of the exhaust gas, from $Eg=Gg\times Hg$.

Figure 15A:
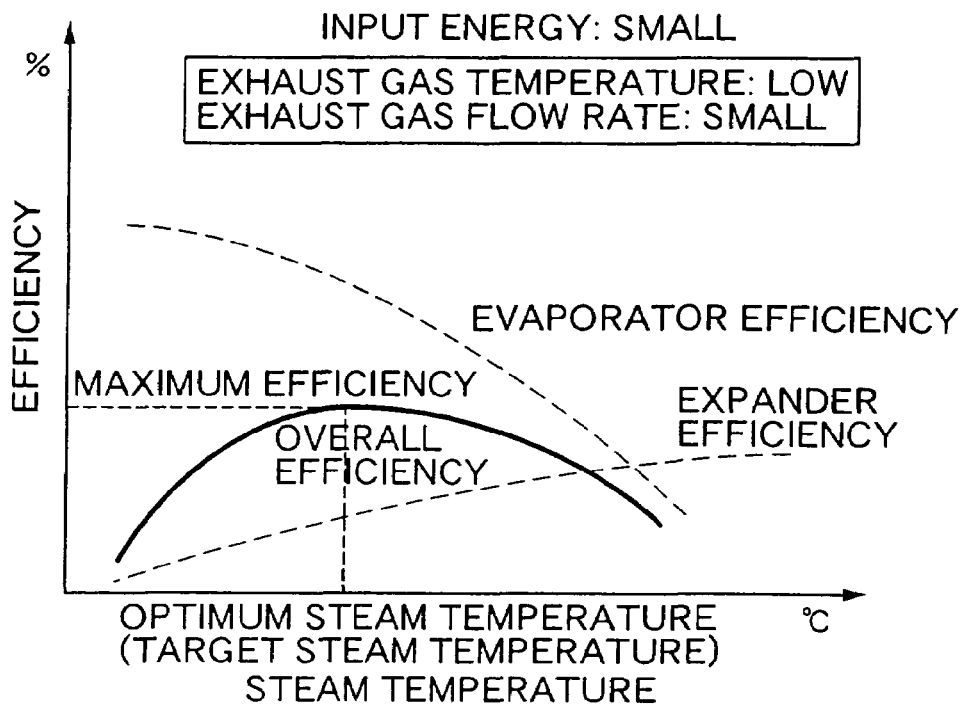
FIG. 15A and FIG. 15B are graphs showing changes in efficiency of an evaporator and an expander due to the input energy and the steam temperature.
Figure 15B:
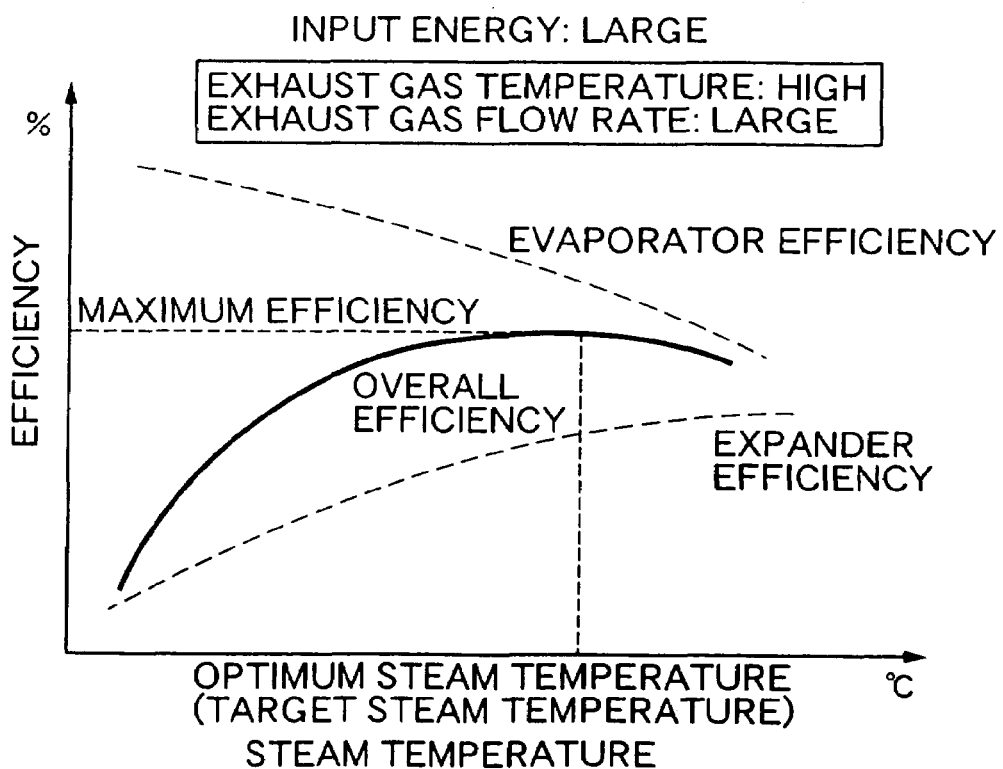
Figure 16:
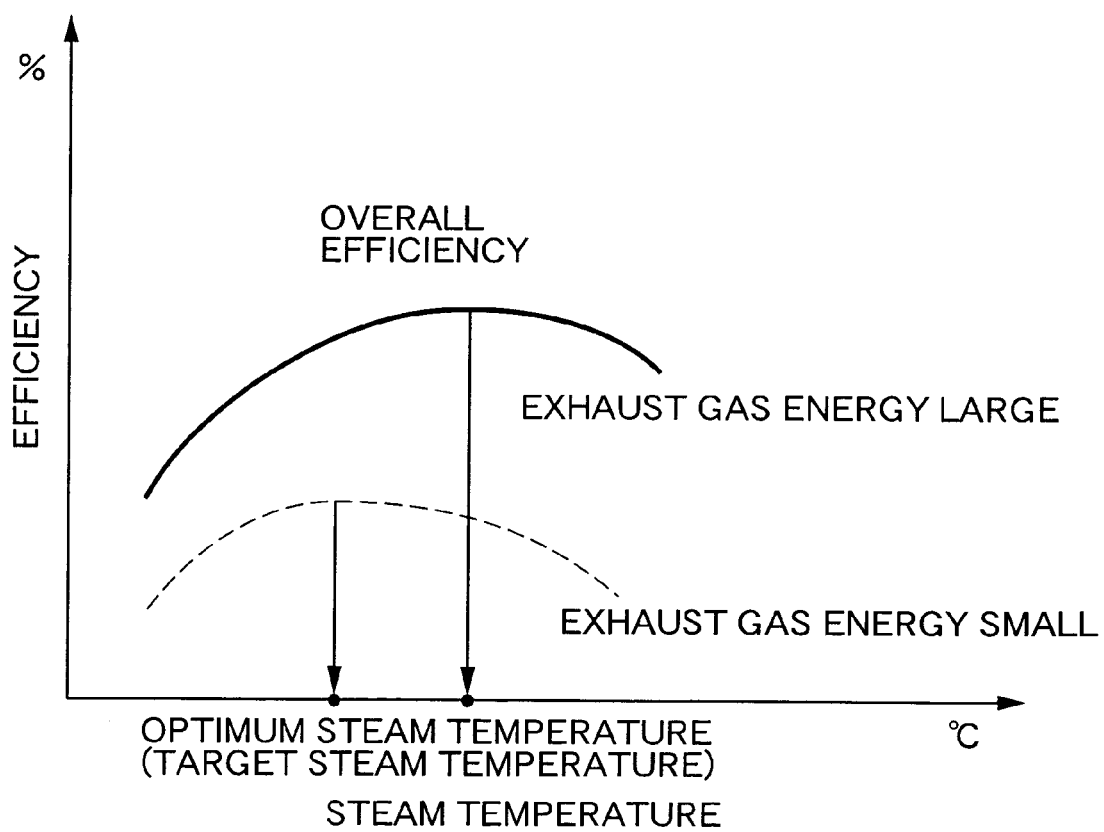
Figure 17:
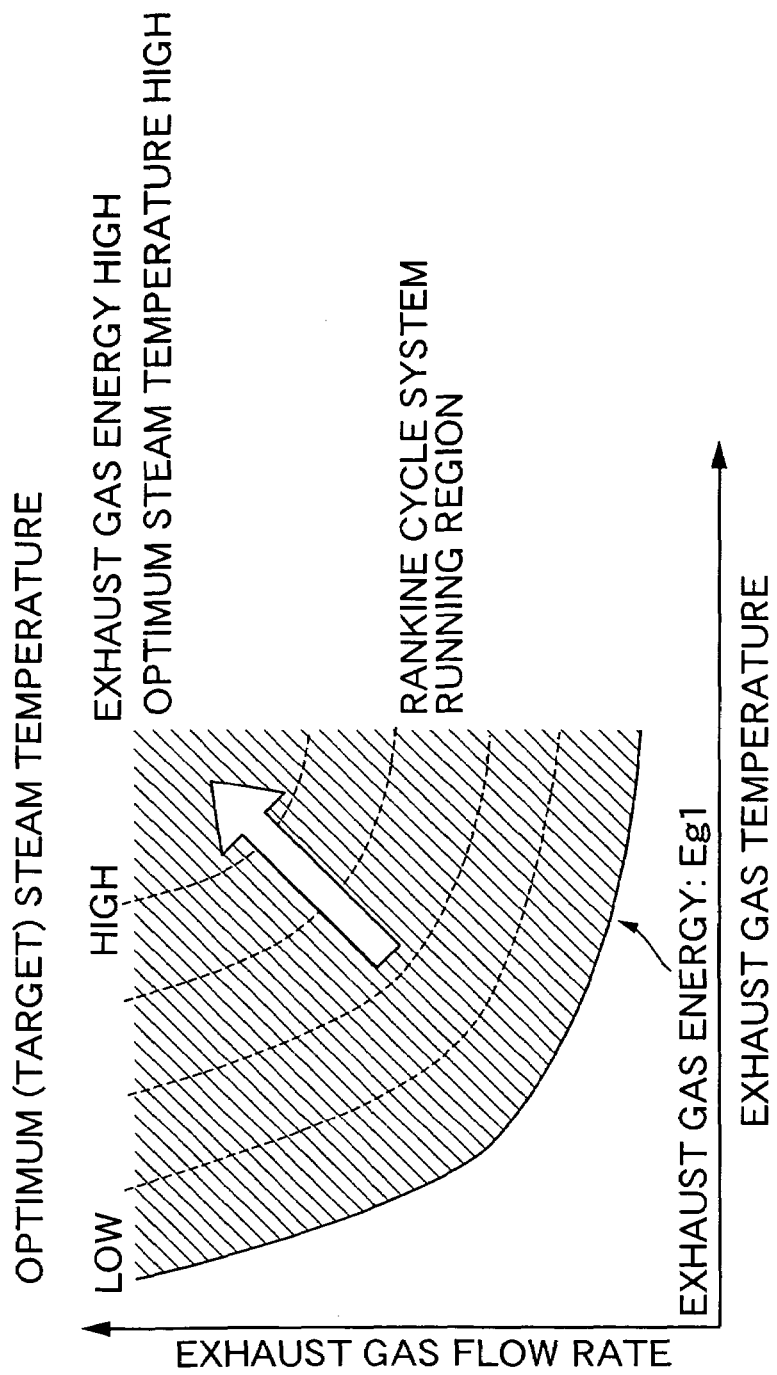
Figure 18:
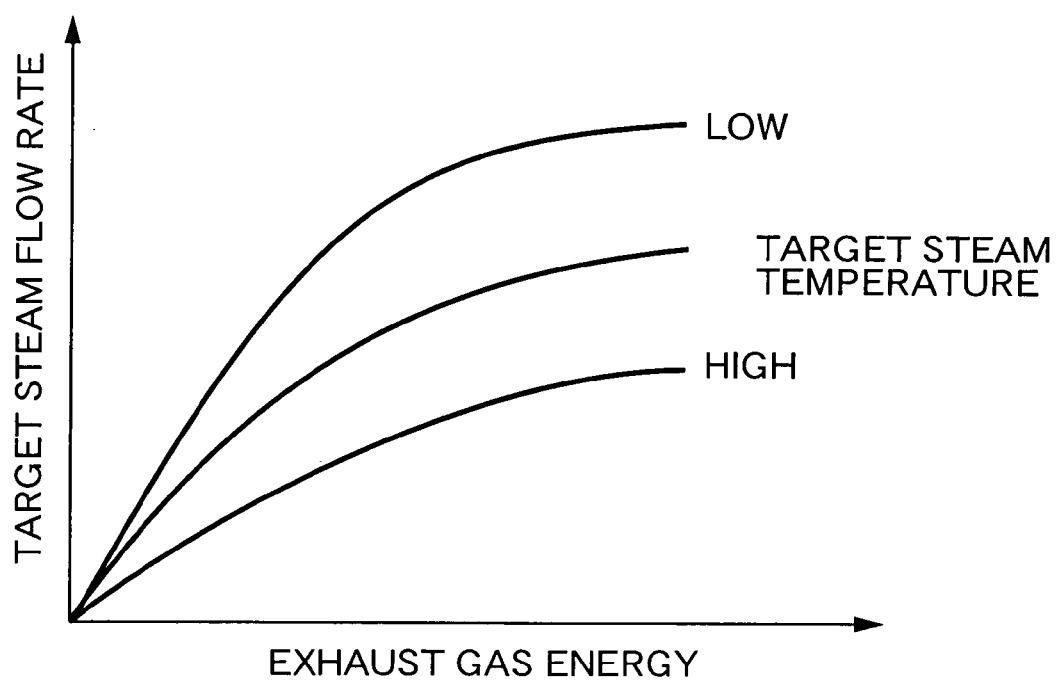

In a subsequent Step S103, if the energy Eg of the exhaust gas is less than a threshold value Eg1, then in Step S104 running of the Rankine cycle system 9 is stopped. In Step S103, if the energy Eg of the exhaust gas is equal to or greater than the threshold value Eg1, then in Step S105 the temperature setting means M1 calculates a target steam temperature Ts_tr of the steam generated by the evaporator 10. As shown in FIG. 15A and FIG. 15B, when the target steam temperature Ts_tr increases, the efficiency of the evaporator 10 decreases but the efficiency of the expander 11 increases, and as a result the overall efficiency of the evaporator 10 and the expander 11 has a peak value at a predetermined target steam temperature Ts_tr. As shown in FIG. 15A, FIG. 15B, FIG. 16, and FIG. 17, the higher the energy Eg of the exhaust gas, the higher the target steam temperature Ts_tr at which this peak value occurs, and the lower the energy Eg of the exhaust gas, the lower the target steam temperature Ts_tr at which it occurs.

When the target steam temperature Ts_tr at which the overall efficiency becomes a maximum is determined from the energy Eg of the exhaust gas in this way, in a subsequent Step S106 a target steam flow rate Gs_tr for obtaining the target steam temperature Ts_tr is calculated. The target steam flow rate Gs_tr is equal to a target amount of water supplied to the evaporator 10. The target steam flow rate Gs_tr can be looked up, using the map of FIG. 18, from the energy Eg of the exhaust gas and the target steam temperature Ts_tr.

In a subsequent Step S107, an actual steam temperature Ts of the steam generated by the evaporator 10 is detected, and if in Step S108 the actual steam temperature Ts does not coincide with the target steam temperature Ts_tr, then in Step S109 the temperature control means M2 carries out feedback control so as to make the actual steam temperature Ts coincide with the target steam temperature Ts_tr. For example, when the actual steam temperature Ts is higher than the target steam temperature Ts_tr, the amount of water supplied to the evaporator 10 is increased, and when the actual steam temperature Ts is lower than the target steam temperature Ts_tr, the amount of water supplied to the evaporator 10 is decreased.

Figure 19:
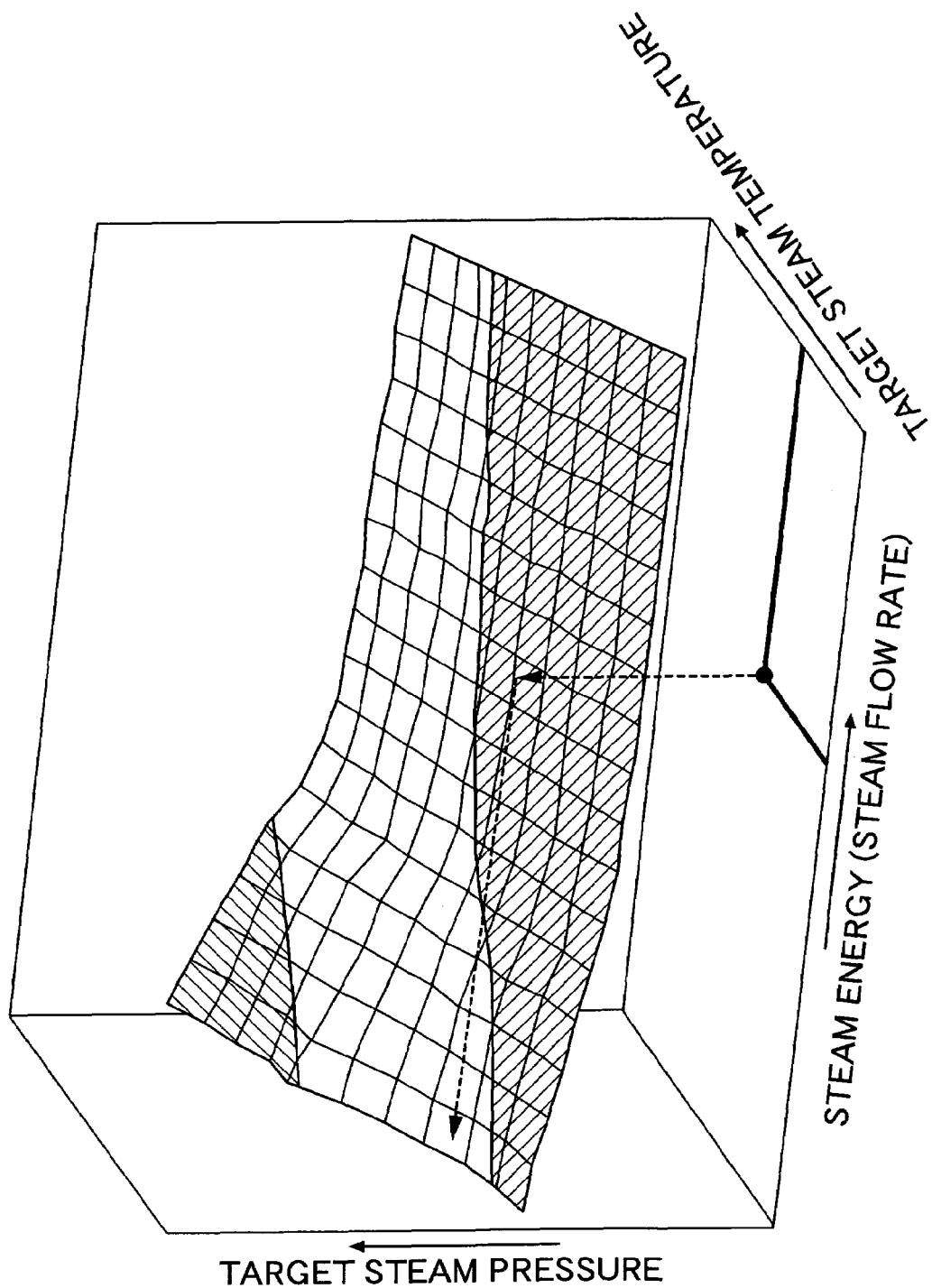
Figure 20:
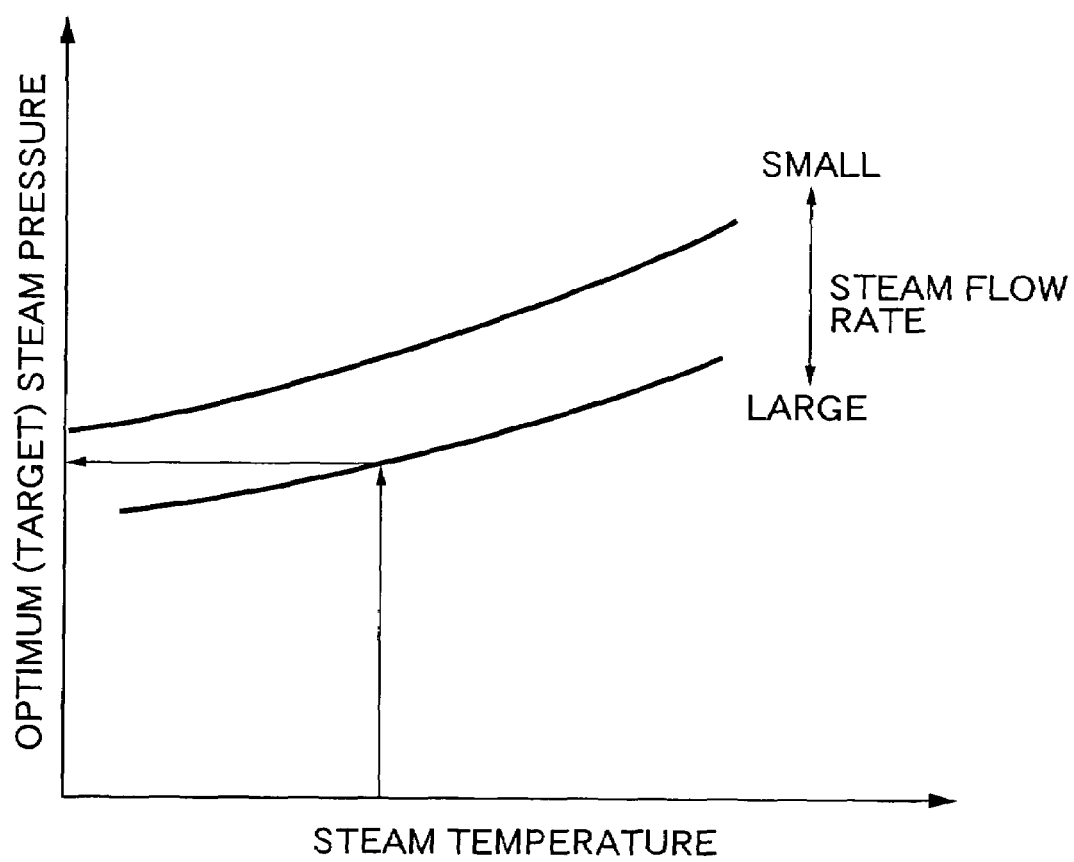
Figure 21:
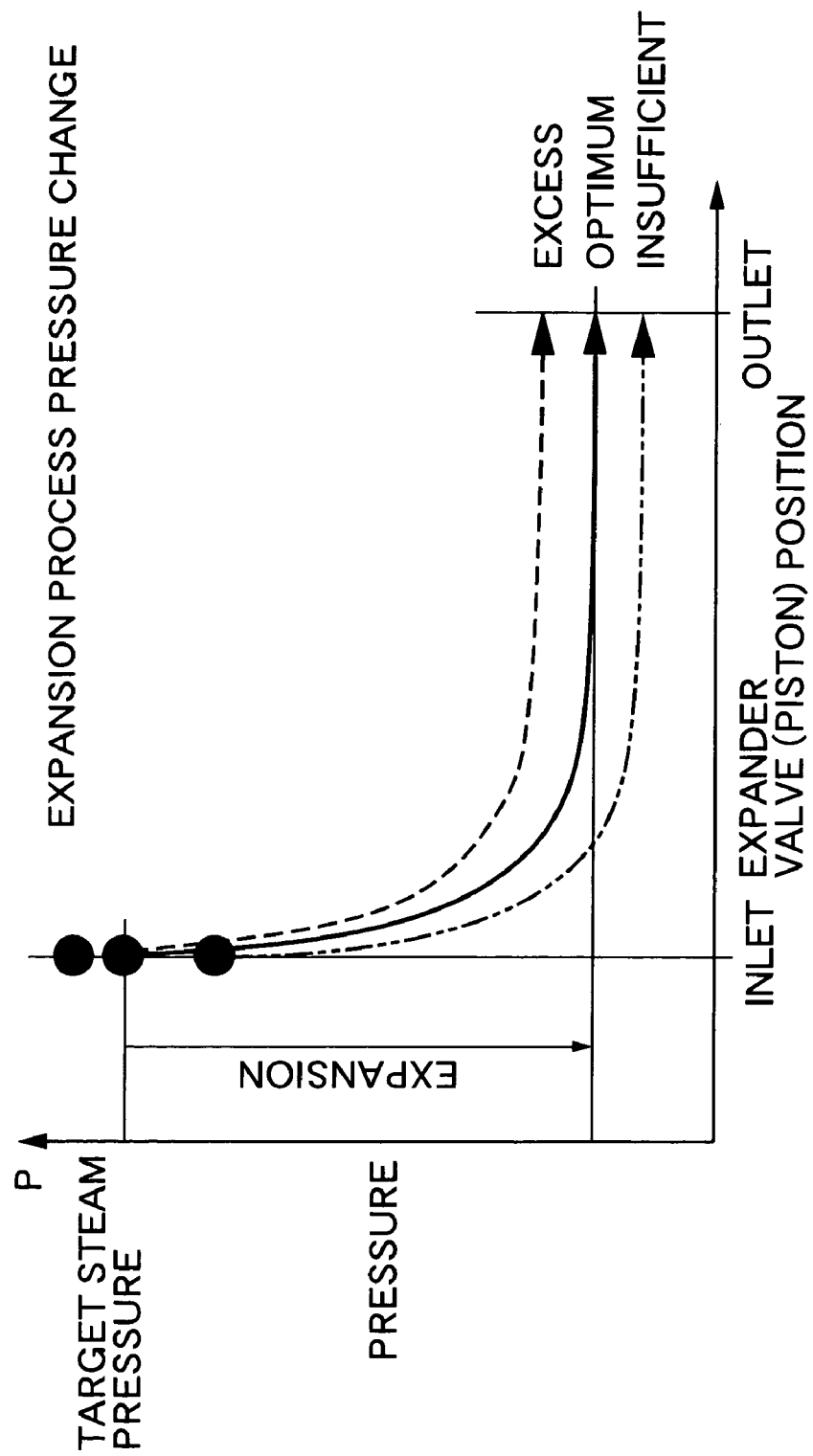

In a subsequent Step S110, the pressure setting means M3 calculates a target steam pressure Ps_tr at the inlet of the expander 11. As shown in FIG. 19 and FIG. 20, the target steam pressure Ps_tr is looked up from the map based on the target steam temperature Ts_tr and the target steam flow rate Gs_tr while taking into consideration the expansion ratio of the expander 11. As shown in FIG. 21, if the steam pressure at the inlet of the expander 11 coincides with the target steam pressure Ps_tr (optimum steam pressure), the steam pressure at the outlet of the expander 11 becomes a pressure that is commensurate with the expansion ratio of the expander 11, but if the target steam pressure Ps_tr is too high, surplus energy remains in the steam that is discharged from the outlet of the expander 11, and there is the problem that the energy is wastefully discarded. On the other hand, if the target steam pressure Ps_tr is too low, the steam discharged from the outlet of the expander 11 has a negative pressure, and the expander 11 carries out negative work, thus causing the problem of a degradation of the efficiency.

After the target steam pressure Ps_tr at which the efficiency of the expander 11 is a maximum is determined in this way, in a subsequent Step S111 an actual steam pressure Ps is detected, and if in Step S112 the actual steam pressure Ps does not coincide with the target steam pressure Ps_tr, then in Step S113 the pressure control means M4 carries out feedback control so that the actual steam pressure Ps coincides with the target steam pressure Ps_tr. Specifically, increasing the rotational speed of the expander 11 decreases the actual steam pressure Ps, and decreasing the rotational speed of the expander 11 increases the actual steam pressure Ps.

As hereinbefore described, since the target steam temperature at the outlet of the evaporator 10 is calculated based on the temperature and the flow rate of the exhaust gas at the inlet of the evaporator 10, and the target steam pressure at the inlet of the expander 11 is calculated based on this target steam temperature, not only is it possible to generate steam having a temperature at which the overall efficiency becomes a maximum, the overall efficiency taking into consideration both the efficiency of the evaporator 10 and the efficiency of the expander 11, which change depending on the steam temperature at the outlet of the evaporator 10, but also the efficiency of the expander 11 can be enhanced by supplying steam having a pressure that is optimum for the expansion ratio of the expander 11.

Figure 23:
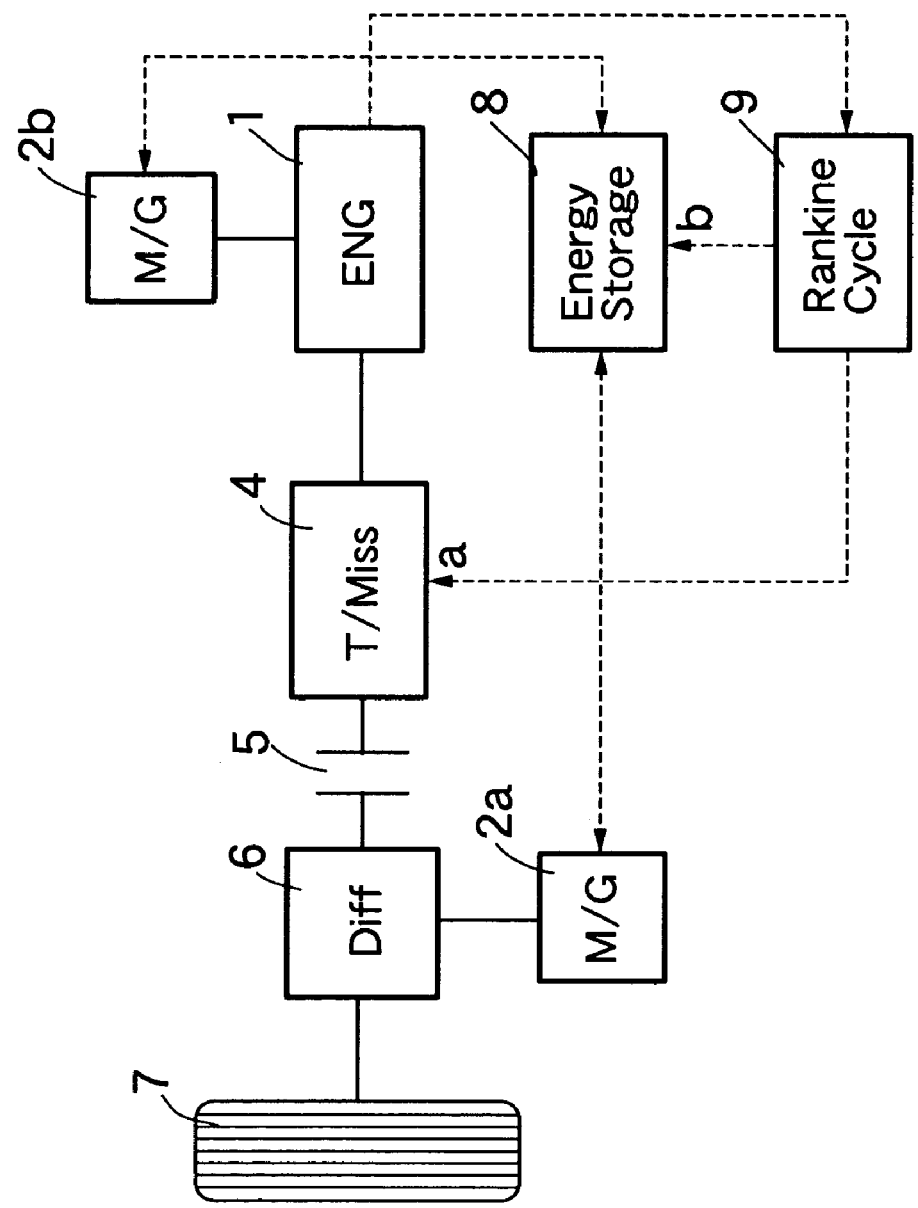
FIG. 23 is a diagram showing the overall arrangement of a hybrid vehicle corresponding to a second embodiment of the present invention.
Figure 24A:
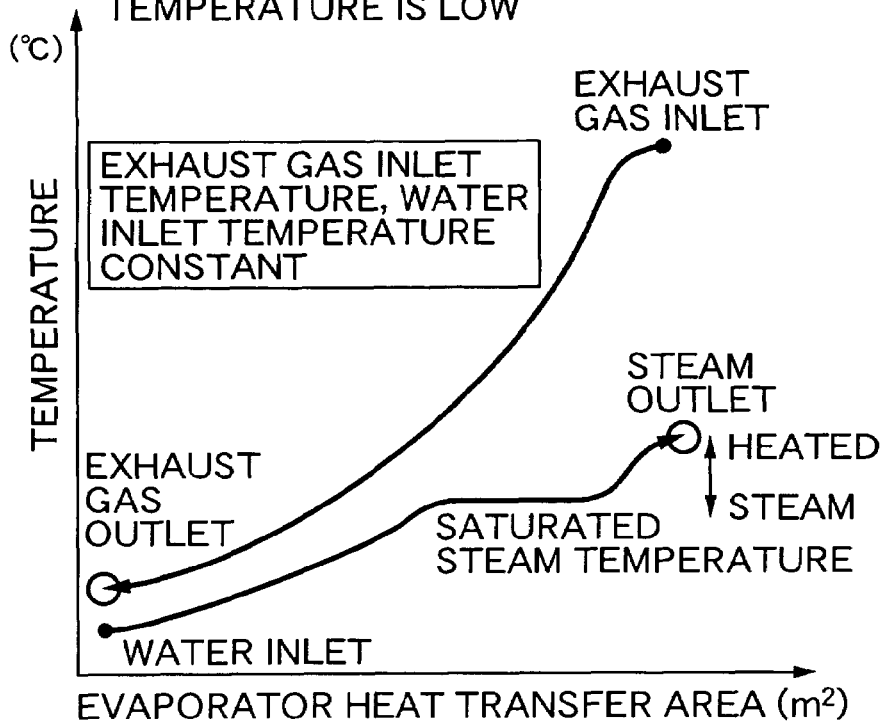
FIG. 24A and FIG. 24B are graphs showing changes in exhaust gas outlet temperature and steam outlet temperature of an evaporator.
Figure 24B:
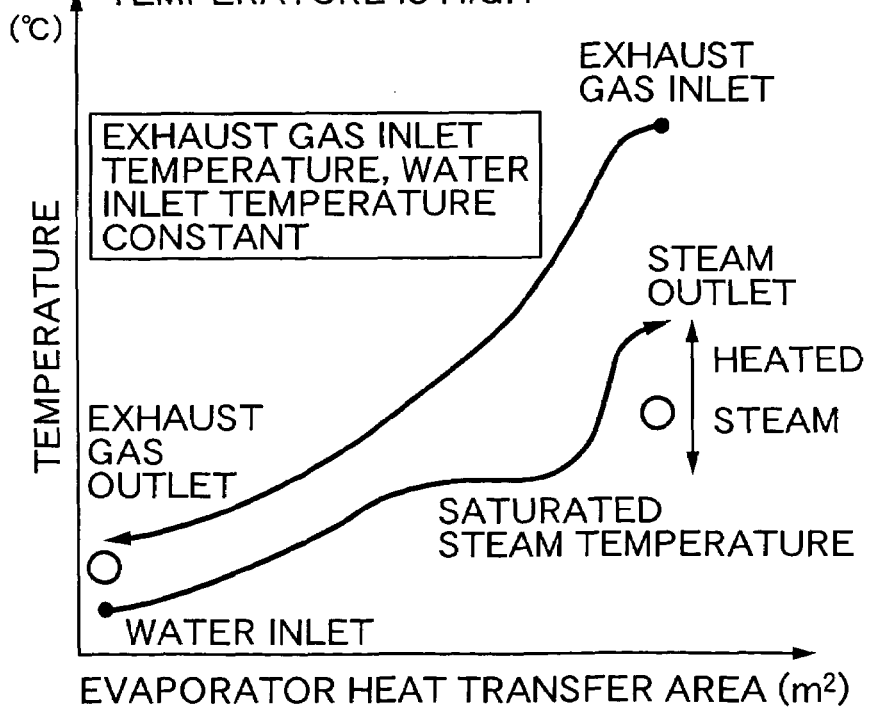

A second embodiment of the present invention is now explained with reference to FIG. 23.

In the first embodiment shown in FIG. 1 the motor/generator 2 is provided between the internal combustion engine 1 and the transmission 4, but in the second embodiment a first motor/generator 2a driven by a battery 8 is connected to a differential 6 and a second motor/generator 2b driven by the battery 8 is connected to an internal combustion engine 1. The first motor/generator 2a is used for traveling by means of the driving force of the first motor/generator 2a alone, for assisting the driving force of the internal combustion engine 1, and for the generation of regenerative electric power, and the second motor/generator 2b is used for starting the internal combustion engine 1 and for generating power by means of the driving force of the internal combustion engine 1. In this embodiment, as in the first embodiment, the driving force output by a Rankine cycle system 9 is input into a transmission 4 via driving force combining means such as a planetary gear train (see arrow a).

Embodiments of the present invention are explained in detail above, but the present invention is not limited to the above-mentioned embodiments and can be modified in a variety of ways.

For example, in the embodiments explained above, as shown by arrow a in FIG. 1 and FIG. 23, although the shaft output from the Rankine cycle system 9 is used directly as a drive source for making the vehicle travel, it is possible to drive a power generator, which is not illustrated, by the shaft output from the Rankine cycle system 9. As shown by arrow b, the electrical power generated by the generator charges the battery 8, and is used for driving the motor/generator 2, 2a, or 2b. Although regenerative electric power cannot be obtained from the motor/generator 2 or 2a when the vehicle is accelerating or when it is cruising, by charging the battery 8 with electrical power generated by the Rankine cycle system 9 at these times the battery 8 can be charged at all times, that is, when accelerating, when cruising, and when decelerating, by electrical power generated by the Rankine cycle system 9 or by regenerative electric power from the motor/generator 2 or 2a, without employing the driving force of the internal combustion engine 1, and the performance of the motor/generator 2, 2a, or 2b can be exhibited fully. In this embodiment, the motor/generator 2 outputs as the motor output Pm an output corresponding to the Rankine cycle output Prc of the first and second embodiments.

Figure 6:
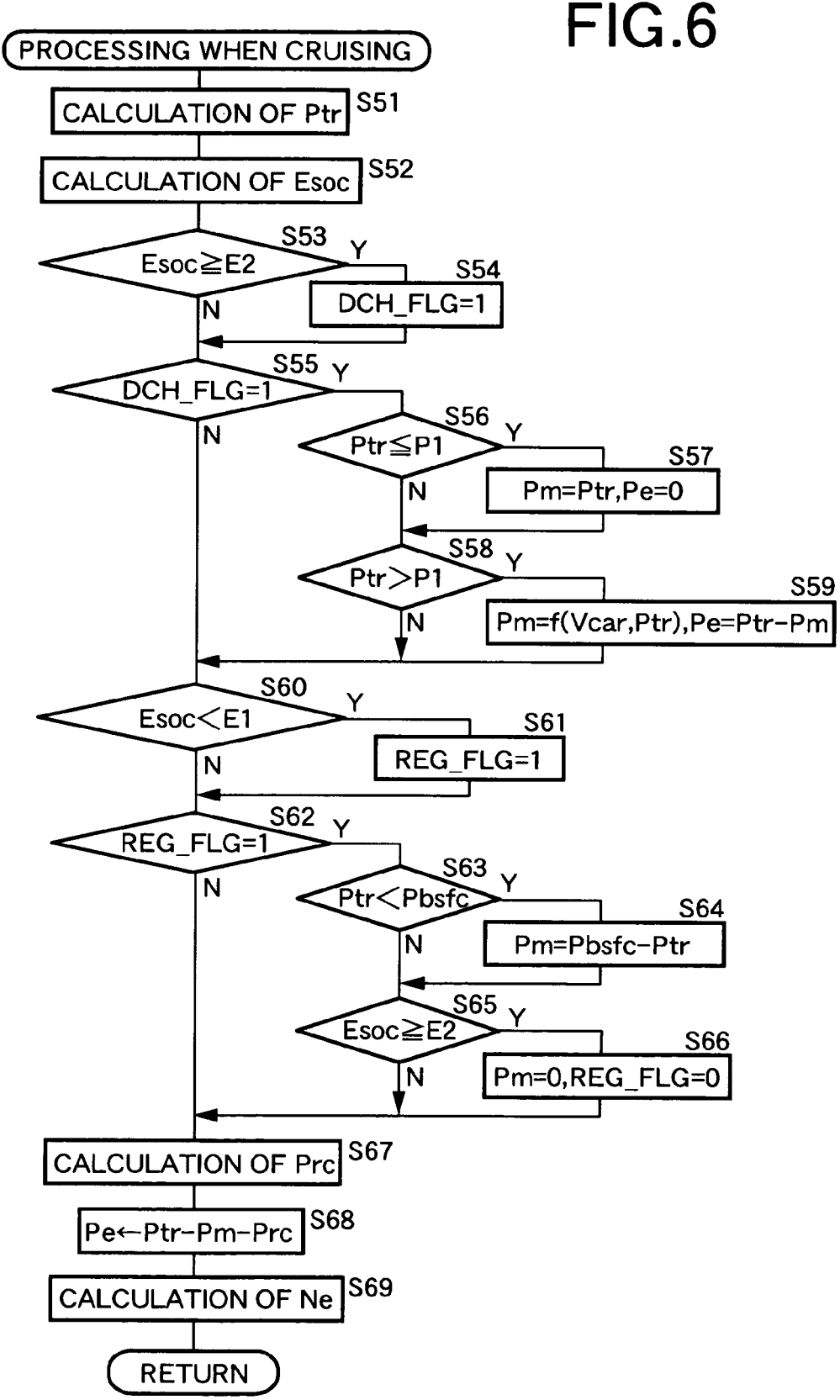

Furthermore, instead of the processing when accelerating shown in FIG. 5, it is possible to employ the processing when cruising shown in FIG. 6.

Moreover, the present invention can be applied to a vehicle that is not equipped with the motor/generator 2, 2a, or 2b.

Furthermore, the present invention can be applied to a Rankine cycle system 9 for any non-vehicular application.

INDUSTRIAL APPLICABILITY

As hereinbefore described, the present invention can be desirably applied to a Rankine cycle system that converts the thermal energy of exhaust gas of an engine mounted on a vehicle into mechanical energy, but it can also be applied to a Rankine cycle system for any other purpose.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A Rankine cycle system-equipped vehicle comprising:
   an internal combustion engine for generating a driving force for traveling; and
   a Rankine cycle system for generating a driving force, the Rankine cycle system being adapted to be operated by exhaust gas of the internal combustion engine when the internal combustion engine is running, and having an output shaft;
   a power generator adapted to be driven by the Rankine cycle system,
   wherein the Rankine cycle system output shaft is adapted to drive the power generator, and
   wherein the Rankine cycle system is operated when the temperature of the exhaust gas of the internal combustion engine is at a predetermined value or higher and the flow rate of the exhaust gas of the internal combustion engine is at a predetermined value or higher.

2. The Rankine cycle system-equipped vehicle according to claim 1, wherein the Rankine cycle system is operated when the vehicle is accelerating and when the vehicle is cruising.

3. The Rankine cycle system-equipped vehicle according to claim 1, wherein the vehicle further includes a motor/generator for generating both a driving force for traveling and a regenerative braking force.

4. The Rankine cycle system-equipped vehicle according to claim 1, wherein the Rankine cycle system is operated when the vehicle is decelerating.

5. The Rankine cycle system-equipped vehicle according to claim 4, wherein the vehicle is determined to be decelerating if the speed of the vehicle is substantially constant on a downhill route.

6. The Rankine cycle system-equipped vehicle according to claim 2, wherein the vehicle is determined to be accelerating if the speed of the vehicle is substantially constant on an uphill route.

7. The Rankine cycle system-equipped vehicle according to claim 2, wherein the vehicle is determined to be in the cruising state if the absolute value of the vehicle acceleration or the vehicle speed is equal to or less than a predetermined value.

8. The Rankine cycle system-equipped vehicle according to claim 1, wherein the vehicle further comprises a battery and means to prevent overcharging of the battery.

9. The Rankine cycle system-equipped vehicle according to claim 1, wherein the vehicle further comprises a transmission and the Rankine cycle system is used to drive the transmission.

10. A Rankine cycle system comprising:
    an evaporator for generating a gas-phase working medium by heating a liquid-phase working medium using exhaust gas of an internal combustion engine; and
    a displacement type expander for converting the thermal energy of the gas-phase working medium generated by the evaporator into mechanical energy,
    wherein the Rankine cycle system comprises:
    temperature setting means for setting the temperature of the gas-phase working medium at the outlet of the evaporator based on the temperature and the flow rate of the exhaust gas at the inlet of the evaporator;
    temperature control means for controlling the temperature of the gas-phase working medium at the outlet of the evaporator wherein the temperature is at the set temperature set by the temperature setting means;
    pressure setting means for setting the pressure of the gas-phase working medium at the inlet of the expander based on the set temperature; and
    pressure control means for controlling the pressure of the gas-phase working medium at the inlet of the expander so that the pressure is at the set pressure set by the pressure setting means.

11. The Rankine cycle system according to claim 10, wherein the temperature control means controls the temperature of the gas-phase working medium by the amount of liquid-phase working medium supplied to the evaporator, and the pressure control means controls the pressure of the gas-phase working medium by the rotational speed of the expander.

12. The Rankine cycle system according to claim 10, wherein the temperature control means provides feedback control to make the actual gas-phase working medium temperature coincide with the set gas-phase working medium temperature.

13. The Rankine system according to claim 10, wherein the pressure control means provides feedback control to make the actual gas phase working medium temperature coincide with a set gas-phase working medium pressure.

\* \* \* \* \*